US009008173B2

(12) United States Patent
Matsuo et al.

(10) Patent No.: US 9,008,173 B2
(45) Date of Patent: Apr. 14, 2015

(54) IMAGE ENCODING AND DECODING APPARATUSES, IMAGE ENCODING AND DECODING METHODS, PROGRAMS THEREOF, AND RECORDING MEDIA RECORDED WITH THE PROGRAMS

(75) Inventors: Shohei Matsuo, Yokosuka (JP); Seishi Takamura, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 760 days.

(21) Appl. No.: 12/682,035

(22) PCT Filed: Oct. 14, 2008

(86) PCT No.: PCT/JP2008/068547
§ 371 (c)(1), (2), (4) Date: Apr. 7, 2010

(87) PCT Pub. No.: WO2009/051091
PCT Pub. Date: Apr. 23, 2009

(65) Prior Publication Data
US 2010/0208803 A1  Aug. 19, 2010

(30) Foreign Application Priority Data
Oct. 15, 2007  (JP) ................................. 2007-267614

(51) Int. Cl.
*H04N 7/12* (2006.01)
*H04N 11/02* (2006.01)
(Continued)

(52) U.S. Cl.
CPC ............. *H04N 19/19* (2014.11); *H04N 19/147* (2014.11); *H04N 19/46* (2014.11); *H04N 19/61* (2014.11);
(Continued)

(58) Field of Classification Search
CPC .................. H04N 19/00042; H04N 19/00278; H04N 19/00763
USPC ..................................................... 375/240.12
See application file for complete search history.

(56) References Cited

U.S. PATENT DOCUMENTS

2005/0069211 A1  3/2005 Lee et al.
2005/0243920 A1  11/2005 Murakami et al.
(Continued)

FOREIGN PATENT DOCUMENTS

EP   1 796 395 A2   6/2007
JP   10-224804 A    8/1998
(Continued)

OTHER PUBLICATIONS

Okubo, Sakae, et al., "Revised Version H.264/AVC Textbook," 2006, pp. 106-112.
(Continued)

*Primary Examiner* — Jeremaiah C Hallenbeck-Huber
(74) *Attorney, Agent, or Firm* — Harness, Dickey & Pierce, P.L.C.

(57) ABSTRACT

A method for encoding an image using an intraframe prediction is provided which includes selecting a gradient of a pixel value that is indicated by an image signal to be predicted among a plurality of gradient candidates, generating a predicted signal by applying a gradient in accordance with the distance from a prediction reference pixel based on the gradient, intraframe-encoding the image signal to be predicted based on the predicted signal, and encoding information indicating the size of the selected gradient. Alternatively, the method includes estimating the gradient of a pixel value that is indicated by an image signal to be predicted based on an image signal which has already been encoded, generating a predicted signal by applying a gradient in accordance with the distance from a prediction reference pixel based on the gradient, and intraframe-encoding the image signal to be predicted based on the predicted signal.

6 Claims, 35 Drawing Sheets

(51) Int. Cl.
| | |
|---|---|
| H04N 11/04 | (2006.01) |
| H04N 19/19 | (2014.01) |
| H04N 19/147 | (2014.01) |
| H04N 19/46 | (2014.01) |
| H04N 19/61 | (2014.01) |
| H04N 19/593 | (2014.01) |
| H04N 19/11 | (2014.01) |
| H04N 19/136 | (2014.01) |
| H04N 19/182 | (2014.01) |

(52) U.S. Cl.
CPC ............. *H04N 19/593* (2014.11); *H04N 19/11* (2014.11); *H04N 19/136* (2014.11); *H04N 19/182* (2014.11)

(56) References Cited

U.S. PATENT DOCUMENTS

| | | | |
|---|---|---|---|
| 2006/0176956 A1* | 8/2006 | Ducloux et al. ......... | 375/240.13 |
| 2007/0223021 A1* | 9/2007 | Song .............................. | 358/1.9 |

FOREIGN PATENT DOCUMENTS

| | | |
|---|---|---|
| JP | 2006-352181 A | 12/2006 |
| RU | 2191469 C2 | 10/2002 |
| WO | 03/101117 A1 | 12/2003 |
| WO | 2006/052399 A1 | 5/2006 |
| WO | 2007/032600 A1 | 3/2007 |

OTHER PUBLICATIONS

"Advanced video coding for generic audiovisual services," ITU-T Recommendation H.264, Mar. 2005, pp. 116-135, International Telecommunications Union.

Shiodera, Taichiro, et al., "Block Based Extra/Inter-polating Prediction for Intra Coding," Proceedings of the 21st Picture Coding Symposium of Japan, Nov. 8-10, 2006, pp. 123-124.

Bjontegaard, Gisle, "Calculation of average PSNR differences between RD-curves," ITU—Telecommunications Standardization Sector, Thirteenth Meeting, Apr. 2-4, 2001, pp. 1-4, Study Group 16, Question 6, Video Coding Experts Group (VCEG).

Li, Xiang, et al., "Gradient Intra Prediction for Coding of Computer Animated Videos," IEEE International Workshop on Multimedia Signal Processing 2006, Oct. 3-6, 2006, ch. II, pp. 50-53.

Min, Kyeong-Yuk, et al., "A New Gradient-Based Mode Selection of Intra Prediction for 4×4 block in H.264/AVC," IECON 2006—32nd Annual Conference on IEEE Industrial Electronics, Nov. 6-10, 2006, pp. 4485-4488.

Matsuo, Shohei, et al., "Weighted Intra Prediction," ITU—Telecommunications Standardization Sector, Study Group 16, Question 6, Video Coding Experts Group, Doc. VCEG-AG18, 33rd Meeting: Shenzhen, China, Oct. 20, 2007.

Shiodera, Taichiro, et al., "Block Based Extra/Inter-Polating Prediction for Intra Coding," IEEE International Conference on Image Processing, Sep. 2007, pp. VI-445-VI-448.

Zhang, Peng, et al., "Multiple Modes Intra-Prediction in Intra Coding," 2004 IEEE International Conference on Multimedia and Expo, Taipei, Taiwan, Jun. 27-30, 2004, pp. 419-422.

Karczewicz, Marta, "Improved Intra Coding," ITU—Telecommunications Standardization Sector, Study Group 16, Question 6, Video Coding Experts Group, Doc. VCEG-AF15, 32nd Meeting: San Jose, California, Apr. 20-21, 2007.

Nan, Zhang, et al., "Spatial Prediction Based Intra-Coding," 2004 IEEE International Conference on Multimedia and Expo, Taipei, Taiwan, Jun. 27-30, 2004, pp. 97-100.

Kim, Jongho, et al., "Complexity Reduction Algorithm for Intra Mode Selection in H.264/AVC Video Coding," Advanced Concepts for Intelligent Vision Systems, LNCS, Springer, vol. 4179, Sep. 2006, pp. 454-465.

Richardson, Iain E. G., "H.264 and MPEG-4 Video Compression: Video Coding for Next-generation Multimedia," Moscow, Technosphera, 2005, pp. 233-240 (pp. 177-184 of Wiley edition).

Elyousfi, Abderrahmane, et al., "Fast Mode Decision Algorithm for Intra prediction in H.264/AVC Video Coding," IJCSNS International Journal of Computer Science and Network Security, vol. 7, No. 1, Jan. 2007, pp. 356-364.

Decision on Grant, Russian Patent Application No. 2010113343, Nov. 6, 2012.

* cited by examiner

Paris CIF 4 × 4

Paris CIF 4 × 4

FIG. 35

| Block size | Frame size | Test sequence | Delta10 | | Delta02 | |
|---|---|---|---|---|---|---|
| | | | ΔPSNR [dB] | ΔBitrate [%] | ΔPSNR [dB] | ΔBitrate [%] |
| 4x4 | QCIF | Container | 0.114 | -0.873 | 0.246 | -1.69 |
| | | Foreman | 0.273 | -2.20 | 0.417 | -3.06 |
| | | Silent | 0.223 | -1.62 | 0.337 | -2.12 |
| | CIF | Paris | 0.167 | -1.28 | 0.347 | -2.32 |
| | | Foreman | 0.147 | -1.32 | 0.280 | -2.28 |
| | | Mobile | 0.395 | -2.70 | 0.546 | -3.47 |
| | | Tempete | 0.282 | -2.04 | 0.405 | -3.60 |
| | SD | WhaleShow | 0.254 | -1.99 | 0.376 | -2.62 |
| | | CrowdedCrosswalk | 0.118 | -1.06 | 0.201 | -1.72 |
| | Average for 4x4 | | 0.219 | -1.68 | 0.351 | -2.54 |
| 8x8 | QCIF | Container | 0.0794 | -0.688 | 0.188 | -1.60 |
| | | Foreman | 0.179 | -1.61 | 0.368 | -3.23 |
| | | Silent | 0.234 | -1.99 | 0.369 | -3.07 |
| | CIF | Paris | 0.157 | -1.29 | 0.313 | -2.49 |
| | | Foreman | 0.0956 | -0.939 | 0.283 | -2.71 |
| | | Mobile | 0.202 | -1.39 | 0.285 | -1.94 |
| | | Tempete | 0.210 | -1.69 | 0.330 | -2.60 |
| | SD | WhaleShow | 0.183 | -1.70 | 0.333 | -3.00 |
| | | CrowdedCrosswalk | 0.101 | -1.08 | 0.225 | -2.32 |
| | Average for 8x8 | | 0.1601 | -1.38 | 0.299 | -2.55 |
| Average for all sequences | | | 0.190 | -1.53 | 0.325 | -2.55 |

IMAGE ENCODING AND DECODING APPARATUSES, IMAGE ENCODING AND DECODING METHODS, PROGRAMS THEREOF, AND RECORDING MEDIA RECORDED WITH THE PROGRAMS

TECHNICAL FIELD

The present invention relates to an image encoding apparatus and a method for encoding an image using intraframe prediction, an image decoding apparatus and a method for decoding encoded data encoded by the image encoding technique, an image encoding program for use in realizing the image encoding apparatus and a computer readable recording medium recorded with the program, and an image decoding program for use in realizing the image decoding apparatus and a computer readable recording medium recorded with the program.

Priority is claimed on Japanese Patent Application No. 2007-267614, filed Oct. 15, 2007, the content of which is incorporated herein by reference.

BACKGROUND ART

Since intraframe prediction encoding that performs a prediction within the same frame can hardly achieve compression efficiency as high as that achieved by interframe prediction encoding that performs a prediction between different frames, there is a demand for an intraframe prediction encoding scheme with high compression efficiency. Moreover, there is a possibility that the improvement of compression efficiency obtained by the intraframe encoding contributes to the improvement of compression efficiency of interframe encoding that refers to the image, and thus in view of this, the improvement of compression efficiency of an intraframe prediction encoding scheme is expected.

The intraframe prediction, which performs a prediction within the same frame in spatial dimensions, has been adopted since video encoding standard H.264/MPEG-4AVC (e.g. refer to pp. 106 of non-patent document 1).

The intraframe prediction is performed on a block by block basis, and in H.264/MPEG-4AVC, three kinds of block sizes (4×4, 8×8, and 16×16) can be used with respect to a luminance signal. Moreover, in the respective block sizes, a plurality of prediction modes can be selected. In the case of a 4×4 and 8×8 block size, 9 kinds of prediction modes have been prepared, and in the case of a 16×16 block size, 4 kinds of prediction modes have been prepared.

With respect to a chrominance signal, only the 8×8 block size can be used, and its prediction direction is the same as that in the luminance signal of a 16×16 block. However, the relationship between prediction mode numbers and prediction directions is different therefrom (e.g. refer to pp. 106-112 of non-patent document 1 and pp. 116-135 of non-patent document 2).

For these various kinds of block sizes and prediction modes, without any exceptions, pixels generated through the intraframe prediction are obtained by copying the same values as those of pixels which are positioned on a block neighboring a block to be encoded and which are nearest to the block to be encoded, without changing the values of the pixels.

As a concrete example, FIG. 36 illustrates the case in which a block to be encoded is a 4×4 block of a luminance signal and its prediction mode is a vertical prediction (a prediction mode 0). Hereinafter, explanation will be made assuming a luminance signal is used unless otherwise mentioned.

In the concrete example as shown in FIG. 36, the value of a pixel X in a block positioned on the upper left of a block to be encoded, the values of pixels A, B, C, and D in a block positioned on the block to be encoded, the values of pixels E, F, G, and H in a block positioned on the upper right of the block to be encoded, and the values of pixels I, J, K, and L in a block positioned on the left of the block to be encoded are used in the prediction.

Since a prediction mode 0 is a prediction in the vertical direction, the value (e.g. 73) of the pixel A is copied into four successive pixels which are positioned below the pixel A. In the same manner, the value (e.g. 79) of the pixel B, the value (e.g. 86) of the pixel C, and the value (e.g. 89) of the pixel D are copied into four successive pixels which are positioned below the pixels B, C, and D, respectively.

As described above, in the conventional art, pixels generated through the intraframe prediction are obtained by copying the same values as those of pixels which are positioned on a block neighboring a block to be encoded and which are nearest to the block to be encoded, without changing the values of the pixels.

In this case, depending on the position of the block to be encoded, there may be no block to be referred to. In this case, the prediction can be performed by assigning a value of 128 or the value of a neighboring pixel. For example, in a block including the uppermost row of a frame, nine pixels from X to H cannot always be referred to, and thus the value of 128 is used. Moreover, if upper left and upper blocks exist, but an upper right block does not exist, predicted pixels are generated by assigning the value of the pixel D to the pixels E, F, G, and H.

Moreover, as an improved intraframe prediction technique, a scheme has been proposed that enables an interpolating prediction from pixels positioned on the right side or lower side of a block by changing the scanning order of blocks in a macro block (e.g. refer to non-patent document 3).

This scheme has proposed that if it is assumed that two kinds of prediction modes A and B are selected from a plurality of prediction mode candidates and predicted values in the case of applying the selected prediction modes to a pixel position $(i, j)$ are indicated as $s_A(i,j)$ and $s_B(i,j)$, the predicted value $s_{bipred}(i, j)$ of the pixel in the pixel position $(i, j)$ is calculated by the following equation, $$S_{bipred}(i,j) = a \cdot s_A(i,j) + b \cdot s_B(i,j), \text{ where } a \text{ and } b \text{ are weight values.}$$

[Non-Patent Document 1] Sakae Okubo, Shinya Kadono, Yoshihiro Kikuchi, and Teruhiko Suzuki: "Revised Version H.264/AVC Textbook," pp. 106-112, 2006

[Non-Patent Document 2] ITU-T Study Group 16-Question 6/16: "Draft new Corrigendum 1 to 1-1.264 "Advanced video coding for generic audiovisual services," pp. 116-135, 2005

[Non-Patent Document 3] Taichiro Shiodera, Akiyuki Tanizawa, and Takeshi Chujoh: "Block Based Extra/Intra-polating Prediction for Intra Coding," Picture Coding Symposium of Japan, $21^{st}$ Symposium Data, pp. 123-124, 2006

DISCLOSURE OF INVENTION

Problem to be Solved by the Invention

As described in non-patent document 1, in the case of generating a predicted pixel, a conventional intraframe prediction copies a reference pixel as it is without changing its pixel value.

In the case in which the value of an original signal is not changed in a prediction direction, the conventional intraframe prediction has no problem. However, in general, the original signal has the property of sequentially changing its value along the prediction direction.

Due to this, in the case of following the conventional intraframe prediction, there is a problem in that it is not possible to avoid the increase of a residual signal, and thus compression efficiency is deteriorated.

That is, there is a problem in that applying the conventional intraframe prediction to an image in which the value of the original signal is spatially changed, i.e. an image that includes great gradation (such an image is common), leads to an increase of a residual signal to deteriorate compression efficiency.

On the other hand, although the scheme described in non-patent document 3 employs the method that performs the intraframe prediction based on the predicted values when two kinds of prediction modes are applied, this method does not perform the prediction using the property of gradation that the original signal has. Accordingly, greatly improving compression efficiency cannot be expected.

The present invention has been made in consideration of the above-described circumstances, and an object thereof is to provide a novel image encoding technique that can improve compression efficiency when an image that includes great gradation by intraframe prediction is encoded.

Means for Solving the Problem

[1] First Aspect

In order to achieve the above object, the present invention provides an image encoding apparatus for encoding an image using an intraframe prediction which includes (i) a selection means for selecting a gradient of a pixel value that is indicated by an image signal to be predicted among a plurality of gradient candidates; (ii) a generation means for generating a predicted signal with a gradient applied thereto in accordance with the distance from a prediction reference pixel based on the gradient selected by the selection means; (iii) an intraframe encoding means for intraframe-encoding the image signal to be predicted based on the predicted signal generated by the generation means; and (iv) a gradient information encoding means for encoding information indicating the size of the gradient (i.e. information about the size itself, information such as an index that makes it possible to identify the size) selected by the selection means.

The above-described processing means may even be realized by a computer program. The computer program may be provided as being recorded in a proper computer readable recording medium or may be provided through a network. The computer program may be installed when the present invention is realized and may operate on control means such as a CPU, thereby realizing the present invention.

To correspond to the image encoding apparatus in accordance with the present invention, the present invention provides an image decoding apparatus for decoding encoded data of an image encoded using an intraframe prediction which includes (i) an acquisition means for acquiring gradient information used on an image encoding side by decoding information for applying a gradient of a pixel value to a predicted signal in accordance with the distance from a prediction reference pixel; (ii) a restoration means for restoring the predicted signal generated on the image encoding side based on the gradient acquired by the acquisition means; and (iii) a generation means for decoding a residual signal encoded on the image encoding side, and generating a decoded image signal based on the decoded residual signal and the predicted signal restored by the restoration means.

The above-described processing means may be realized even by a computer program. The computer program may be provided as being recorded in a proper computer readable recording medium or may be provided through a network. The computer program may be installed when the present invention is realized and may operate on control means such as a CPU, thereby realizing the present invention.

In the first aspect of the present invention as configured above, the image encoding apparatus, for example, generates a plurality of predicted signal candidates having different gradients based on the plurality of gradient candidates, and selects the gradient indicated by the image signal to be predicted among the plurality of gradient candidates by identifying the predicted signal candidate having the minimum encoding cost among the predicted signal candidates.

Then, the image encoding apparatus generates the predicted signal with the gradient applied thereto in accordance with the distance from the prediction reference pixel based on the selected gradient, and performs intraframe-encoding of the image signal to be predicted based on the generated predicted signal. Then, the image encoding apparatus encodes information indicating the size of the selected gradient to inform the image decoding apparatus of the size of the selected gradient.

The image decoding apparatus which has received the encoded data generated by the image encoding apparatus, acquires information about the gradient used on the image encoding side by decoding the information indicating the size of the encoded gradient. Then, the image decoding apparatus restores the predicted signal generated on the image encoding side based on the acquired gradient, decodes the residual signal encoded on the image encoding side, and generates the decoded image signal based on the decoded residual signal and the restored predicted signal.

[2] Second Aspect

Moreover, in order to achieve the above object, the present invention provides an image encoding apparatus for encoding an image using an intraframe prediction which includes (i) an estimation means for estimating a gradient of a pixel value that is indicated by an image signal to be predicted based on an image signal which has already been encoded; (ii) a generation means for generating a predicted signal with a gradient applied thereto in accordance with the distance from a prediction reference pixel based on the gradient estimated by the estimation means; and (iii) an intraframe-encoding means for intra frame-encoding the image signal to be predicted based on the predicted signal generated by the generation means.

The above-described processing means may be realized even by a computer program. The computer program may be provided as being recorded in a proper computer readable recording medium or may be provided through a network. The computer program may be installed when the present invention is realized and may operate on control means such as a CPU, thereby realizing the present invention.

To correspond to the image encoding apparatus in accordance with the present invention, the present invention provides an image decoding apparatus for decoding encoded data of an image encoded using an intraframe prediction which includes (i) an estimation means for estimating a gradient of a pixel value that is indicated by an image signal to be predicted based on an image signal which has already been decoded; (ii) a predicted signal generation means for generating a predicted signal with a gradient applied thereto in accordance with the distance from a prediction reference pixel based on the gradient estimated by the estimation means; and (iii) a decoded image signal means for decoding a residual signal encoded on an image encoding side, and generating a decoded image signal based on the decoded residual signal and the predicted signal generated by the predicted signal generation means.

The above-described processing means may be realized even by a computer program. The computer program may be provided as being recorded in a proper computer readable recording medium or may be provided through a network. The computer program may be installed when the present invention is realized and may operate on control means such as a CPU, thereby realizing the present invention.

In the second aspect of the present invention as configured above, the image encoding apparatus estimates the gradient indicated by the image signal to be predicted based on the image signal which has already been encoded. Then, the image encoding apparatus generates the predicted signal with the gradient applied thereto in accordance with the distance from the prediction reference pixel based on the estimated gradient, and performs intraframe-encoding of the image signal to be predicted based on the generated predicted signal.

The image decoding apparatus which has received the encoded data generated by the image encoding apparatus, estimates the gradient indicated by the image signal to be predicted based on the image signal which has already been decoded. Then, the image decoding apparatus generates the predicted signal with the gradient applied thereto in accordance with the distance from the prediction reference pixel based on the estimated gradient. Then, the image decoding apparatus decodes the residual signal encoded on the encoding side, and generates the decoded image signal based on the decoded residual signal and the generated predicted signal.

In the second aspect of the present invention, since the image encoding apparatus and the image decoding apparatus estimate the gradient in accordance with the same algorithm, it is not required for the image encoding apparatus to inform the image decoding apparatus of the size of the estimated gradient. Accordingly, the amount of the encoded data generated by the image encoding apparatus becomes small to that extent, but the image decoding apparatus should execute an operation for estimating the gradient.

Accordingly, when it is required to reduce the amount of operation in the image decoding apparatus, the image encoding apparatus may be provided with a gradient information encoding means (which can be also realized by a computer program) for encoding information that indicates the size of the estimated gradient.

In this case, in the same manner as the above-described first aspect, the image decoding apparatus decodes the encoded data generated by the image encoding apparatus.

As described above, in the same manner as the first aspect of the present invention, the second aspect of the present invention does not consider the signal value per se of the reference pixel as the predicted signal, but it applies the gradient thereto, thereby realizing the intraframe prediction with a smaller prediction error. That is, by applying the gradient to the value of the reference pixel, it is possible to generate pixels that can provide a further reduced prediction error, and as a result, an efficient intraframe prediction, which is an object of the present invention, can be realized.

It is noted that for the case in which a prediction mode of an intraframe prediction is a DC prediction in accordance with video encoding standard H.264/MPEG-4AVC, the present invention provides an image encoding apparatus which includes (i) means for selecting a gradient applied to an image signal to be predicted among a plurality of gradient candidates that indicate a value added to a pixel value; (ii) means for generating a predicted signal to which the selected gradient is applied; (iii) means for intraframe-encoding the image signal to be predicted based on the generated predicted signal; and (iv) means for encoding information that indicates the size of the selected gradient.

In the same manner, for the case in which a prediction mode of an intraframe prediction is a DC prediction in accordance with video encoding standard H.264/MPEG-4AVC, the present invention provides an image encoding apparatus which includes (i) means for estimating a gradient that indicates a value added to a pixel value of an image signal to be predicted based on an image signal which has already been encoded; (ii) means for generating a predicted signal to which the estimated gradient is applied; and (iii) means for intraframe-encoding the image signal to be predicted based on the generated predicted signal.

Although these encoding apparatuses correspond to the first and second aspects, respectively, their "gradient" settings (i.e. characteristics) suit the DC prediction.

That is, the basic operation of selecting or estimating the gradient and generating a predicted signal based on the gradient is common with the first and second aspects.

The present invention provides the following image decoding apparatuses corresponding to the image encoding apparatuses that deal with the DC prediction:

(i) An image decoding apparatus which includes means for acquiring gradient information used on an image encoding side by decoding information for applying a gradient indicating an added value to a pixel value of a predicted signal; means for restoring the predicted signal generated on the image encoding side based on the acquired gradient; and means for decoding a residual signal encoded on the image encoding side, and generating a decoded image signal based on the decoded residual signal and the restored predicted signal.

(ii) An image decoding apparatus which includes means for estimating a gradient that indicates a value added to a pixel value of an image signal to be predicted based on an image signal which has already been decoded; means for generating a predicted signal to which the estimated gradient is applied; and means for decoding a residual signal encoded on the image encoding side, and generating a decoded image signal based on the decoded residual signal and the generated predicted signal.

Advantageous Effects of the Invention

As described above, according to the present invention, it is possible to execute an efficient intraframe prediction with respect to an image including a gradation that may cause prediction errors to increase and thus cause the deterioration of the encoding efficiency in the conventional intraframe prediction, and thus it is possible to improve compression efficiency.

BRIEF DESCRIPTION OF THE DRAWINGS

FIG. 35 is also a diagram explaining the result of experiments.

EXPLANATION OF REFERENCE SYMBOLS

Figure 1:
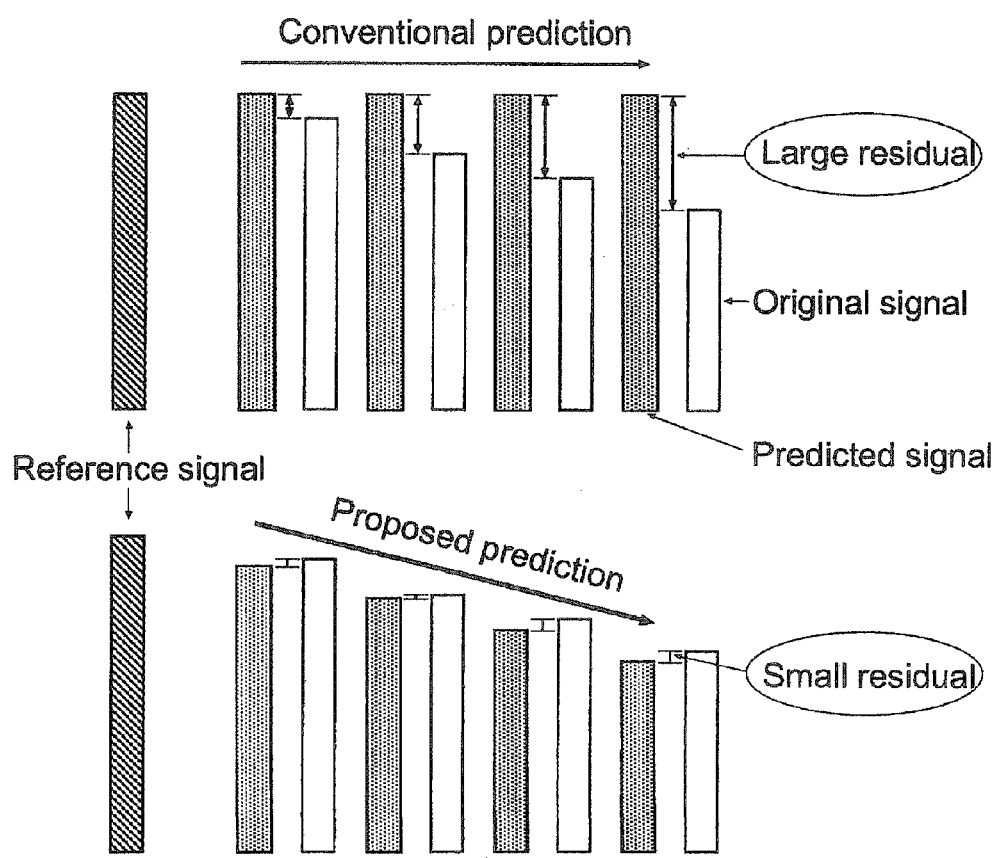
FIG. 1 is a diagram explaining a difference between an intraframe prediction according to the present invention and a conventional intraframe prediction.

10: intraframe prediction encoding apparatus
101: gradient selection unit
102: prediction mode selection unit
103: intraframe prediction unit
104: rate distortion cost calculation unit
105: minimum cost storage unit
106: minimum cost initialization unit
107: cost determination unit
108: optimum encoding information storage unit
109: loop end determination unit
110: optimum encoding information encoding unit
111: intraframe encoding unit

BEST MODE FOR CARRYING OUT THE INVENTION

In the present invention, the signal value per se of a reference pixel is not considered as a predicted signal, but a gradient is applied thereto to thereby realize intraframe prediction with a smaller prediction error.

That is, as shown in FIG. 1, it is assumed that a block to be encoded includes a gradation. In this case, as shown in the lower half of FIG. 1, the present invention generates a predicted signal similar to the original signal by applying a constant gradient to the predicted signal, thereby the residual signal can be decreased, and the efficiency improvements in the intraframe prediction can be realized.

In a conventional intraframe prediction, as shown in the upper half of FIG. 1, the value of a reference pixel is directly applied to predicted pixels in all prediction directions, and thus when the original signal has a gradation that is spatially changed, it is not possible to avoid the increase of prediction error.

In contrast, by applying a gradient to the value of the reference pixel, the present invention can generate pixels so that a prediction error can be further reduced, and as a result, an efficient intraframe prediction, which is an object of the present invention, can be realized.

Hereinafter, the present invention will be described in detail in accordance with embodiments.

Figure 2:
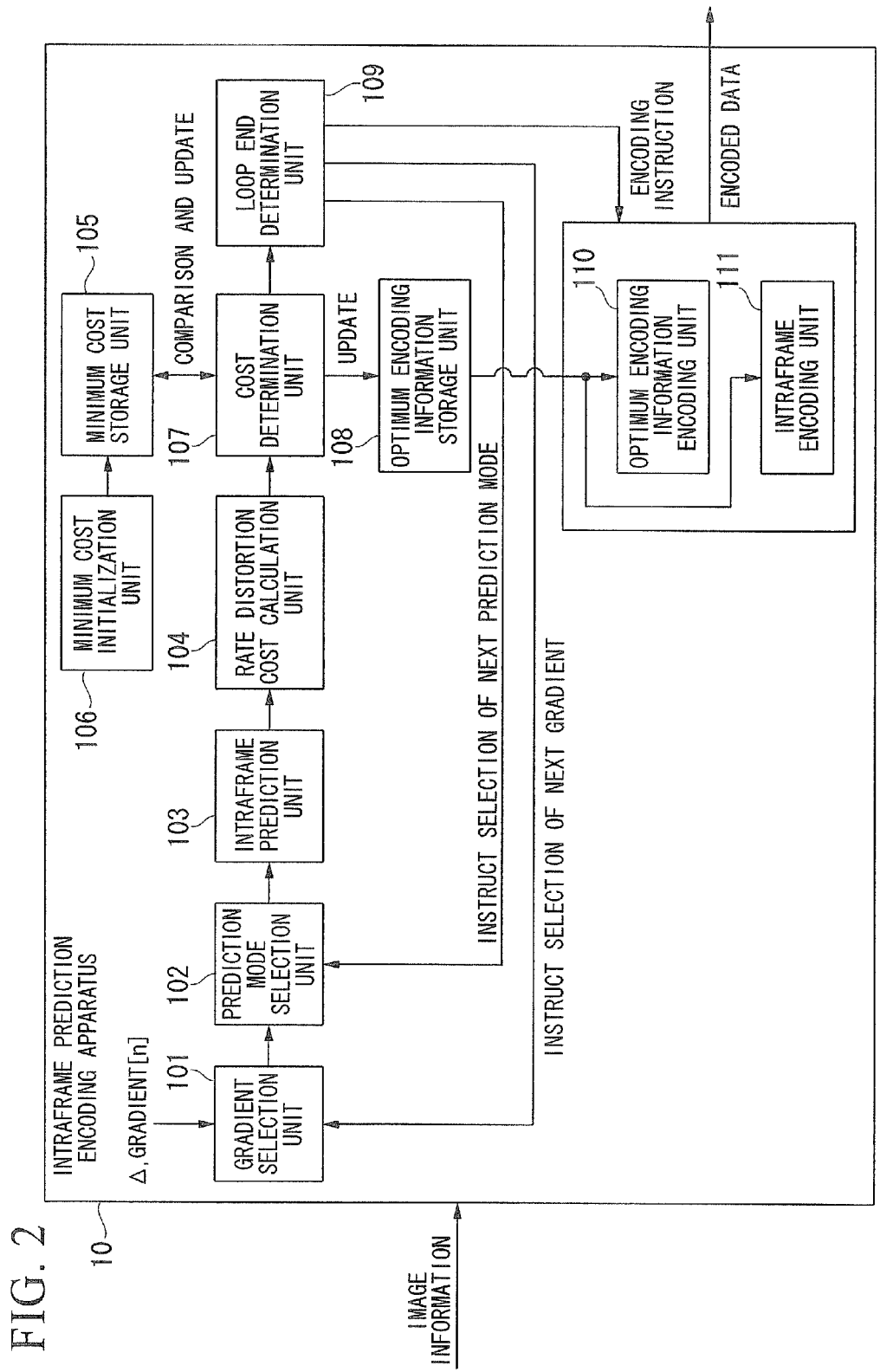
FIG. 2 is an embodiment of an intraframe prediction encoding apparatus according to the present invention.

FIG. 2 illustrates an intraframe prediction encoding apparatus 10 according to an embodiment of the present invention.

An intraframe prediction encoding apparatus 10 according to the present invention encodes an image to be processed, which may be a still image or an image to be subjected to intraframe encoding included in video, using an intraframe prediction. As shown in FIG. 2, the intraframe prediction encoding apparatus 10 includes a gradient selection unit 101, a prediction mode selection unit 102, an intraframe prediction unit 103, a rate distortion cost calculation unit 104, a minimum cost storage unit 105, a minimum cost initialization unit 106, a cost determination unit 107, an optimum encoding information storage unit 108, a loop end determination unit 109, an optimum encoding information encoding unit 110, and an intraframe encoding unit 111.

The gradient selection unit 101 selects a gradient to be applied to a predicted signal (exactly speaking, a candidate of such a gradient when the gradient selection unit 101 performs selection).

The prediction mode selection unit 102 selects a prediction mode for the intraframe prediction.

The intraframe prediction unit 103 generates a predicted signal with a gradient used in the intraframe prediction applied thereto based on the gradient selected by the gradient selection unit 101 and the prediction mode selected by the prediction mode selection unit 102.

The rate distortion cost calculation unit 104 calculates a rate distortion cost that is an encoding cost based on the predicted signal generated by the intraframe prediction unit 103.

The minimum cost storage unit 105 stores the minimum value of the rate distortion cost calculated by the rate distortion cost calculation unit 104.

When the intraframe prediction encoding starts, the minimum cost initialization unit 106 writes an initial value of the rate distortion cost that indicates a large value into the minimum cost storage unit 105.

The cost determination unit 107 compares the rate distortion cost calculated by the rate distortion cost calculation unit 104 with the rate distortion cost stored in the minimum cost storage unit 105, and if the rate distortion cost calculated by the rate distortion cost calculation unit 104 is smaller, the cost determination unit 107 updates the rate distortion cost stored in the minimum cost storage unit 105 using the rate distortion cost calculated by the rate distortion cost calculation unit 104, and further updates information on the gradient and the prediction mode stored in the optimum encoding information storage unit 108 in accordance with the gradient and the prediction mode at that time.

The optimum encoding information storage unit 108 stores information on the optimum gradient and the prediction mode, which will be updated by the cost determination unit 107.

The loop end determination unit 109 instructs the gradient selection unit 101 to select the next gradient, and simultaneously instructs the prediction mode selection unit 102 to select the next prediction mode. Accordingly, the loop end determination unit 109 performs control so that all the combinations of gradients and prediction modes are selected, and if all the combinations of the gradients and the prediction modes have been selected, the loop end determination unit 109 instructs the optimum encoding information encoding unit 110 and the intraframe encoding unit 111 to perform the encoding.

Upon receipt of an encoding instruction from the loop end determination unit 109, the optimum encoding information encoding unit 110 reads the information on the gradient and the prediction mode from the optimum encoding information storage unit 108, and encodes the information.

Upon receipt of an encoding instruction from the loop end determination unit 109, the intraframe encoding unit 111 reads the information on the gradient and the prediction mode from the optimum encoding information storage unit 108, generates a predicted signal to which a gradient is applied in accordance with the read gradient and prediction mode, and encodes a residual signal between the image signal of the block to be encoded and the generated predicted signal.

Next, the intraframe prediction that is executed by the intraframe prediction encoding apparatus 10 according to the present embodiment will be described in accordance with FIG. 3. Here, in FIG. 3, it is assumed that the block to be encoded is a 4×4 block.

In the intraframe prediction encoding apparatus 10 according to the present invention, the size that is a reference of the gradient is defined as a gradient constant Δ, and the range that can be taken by the gradient is defined as a gradient adjustment coefficient gradient[n]. Here, Δ is a constant, and the value of n is an integer which indicates the number of (kinds of) gradients that can be taken.

Figure 3:
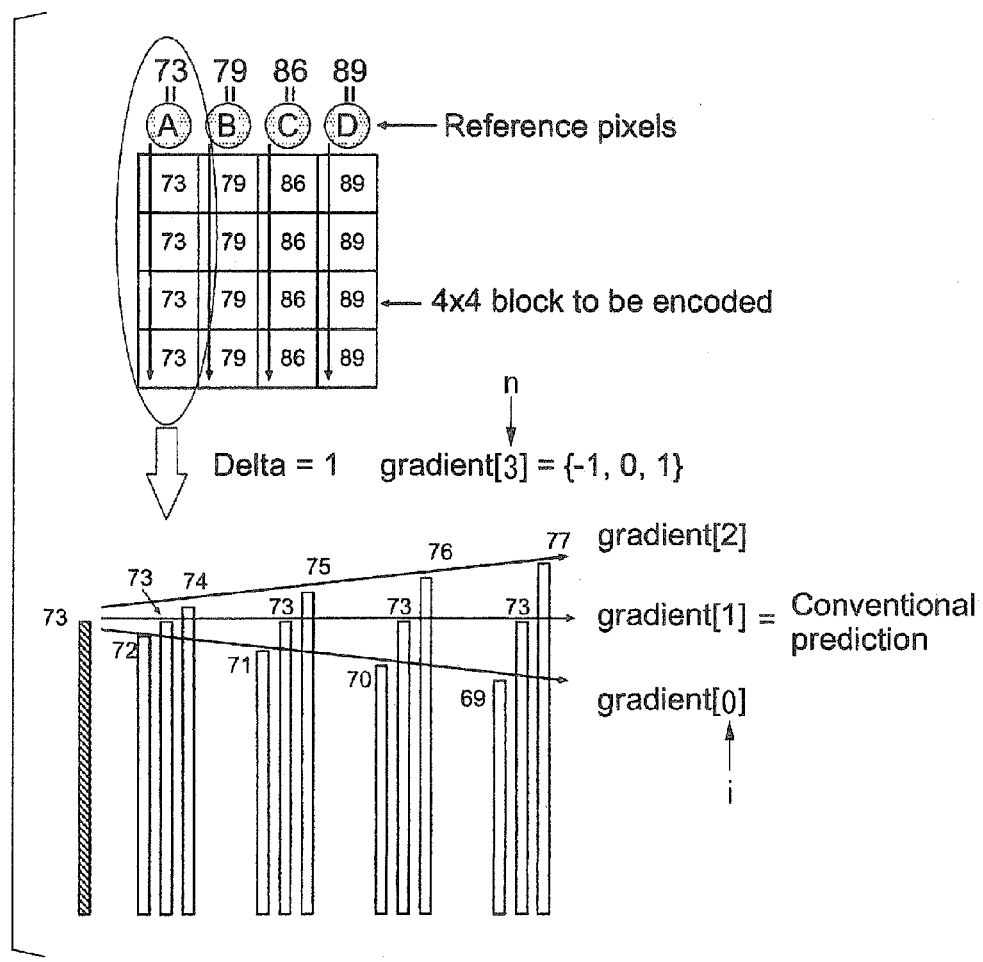
FIG. 3 is a diagram explaining an intraframe prediction executed by the intraframe prediction encoding apparatus according to the same embodiment.

FIG. 3 illustrates an example of a vertical prediction under the condition of Δ=1 and n=3. Moreover, the gradient α for one-pixel distance is defined as $$\alpha = \Delta \times \text{gradient}[n] (0 \le i < n).$$

That is, if n=3, three kinds of gradients 1×gradient[0], 1×gradient[1], and 1×gradient[2] are obtained for one-pixel distance.

Although the values of gradient[0], gradient[1], and gradient[2] may be set to any values, they are set to −1, 0, and 1 in the example shown in FIG. 3.

As described above, if it is assumed that the pixel value of a predicted pixel is y, the distance from a reference pixel to the predicted pixel is x, and the pixel value of the reference pixel is β, the pixel value y of the predicted pixel is defined as in Equation (1).

$$y = \alpha x + \beta \qquad \text{Equation (1)}$$

That is, the gradient α is applied to the distance from the reference pixel to the predicted pixel.

The intraframe prediction encoding apparatus 10 according to the present embodiment that is configured as shown in FIG. 2 generates a predicted signal in accordance with Equation (1).

Figure 4:
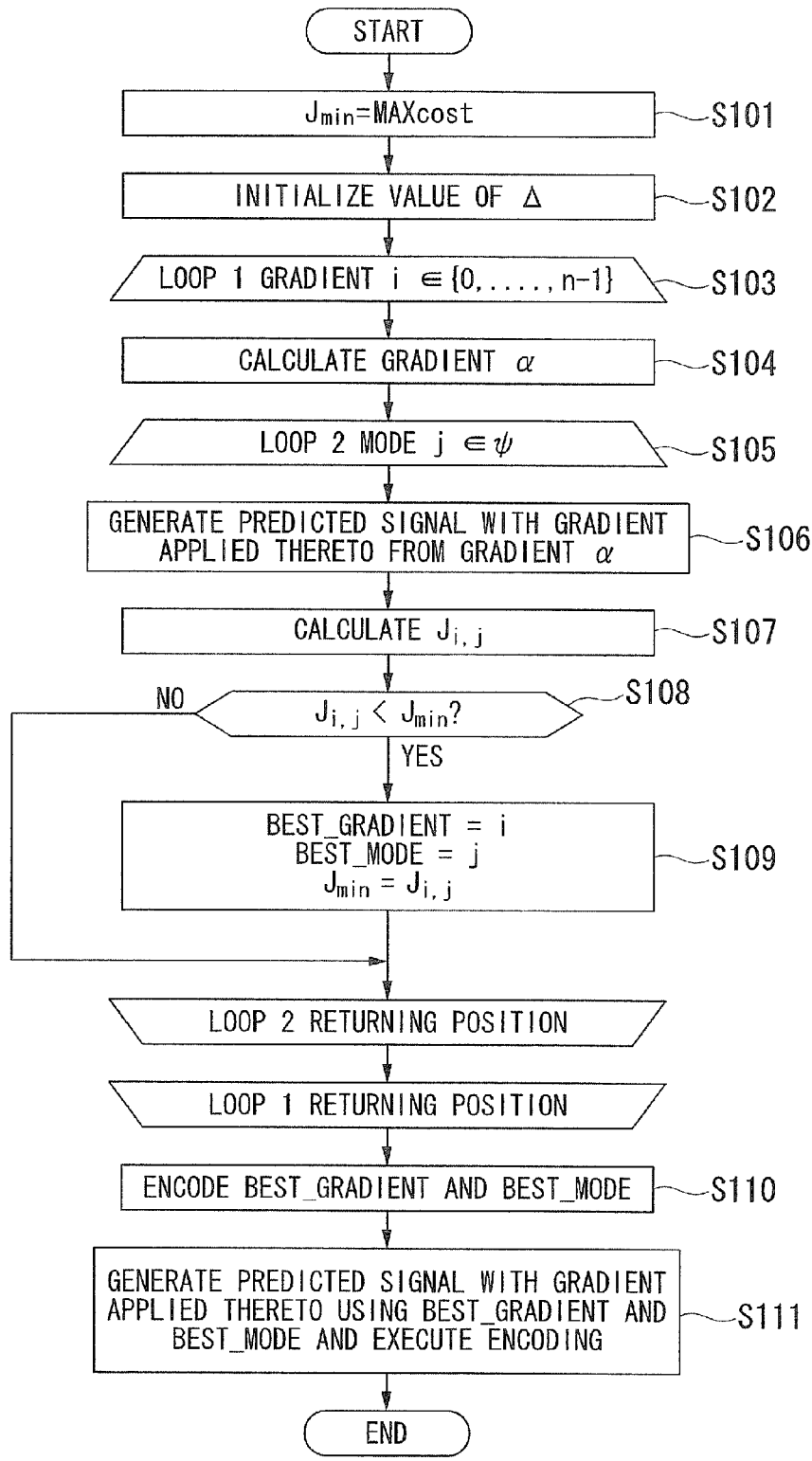
FIG. 4 is a flowchart executed by the intraframe prediction encoding apparatus according to the same embodiment.

FIG. 4 illustrates a flowchart executed by the intraframe prediction encoding apparatus 10 according to the present embodiment. The operation executed by the intraframe prediction encoding apparatus 10 will now be described in accordance with the flowchart.

If a block to be encoded which is subjected to an intraframe prediction encoding process is given, as shown in the flowchart of FIG. 4, in the first place, in step S101, the intraframe prediction encoding apparatus 10 according to the present embodiment initializes the minimum value $J_{min}$ of a rate distortion cost $J_{i,j}$, which is to be used in step S107 described later, to MAXcost that indicates a sufficiently large value (i.e. a value which has no possibility that the rate distortion cost $J_{i,j}$ actually takes).

Then, in step S102, the value of the gradient constant Δ is initialized into a predetermined value.

Then, in step S103, a loop 1 (where, variable is i) that designates the size of the gradient is started. That is, the loop 1 is an n-times loop that corresponds to the number of the kinds of gradients. At the first round, zero is assigned to i as an initial value.

Then, in step S104, the gradient α is calculated from Δ and gradient[i], and then it is preserved. In an example as shown in FIG. 3, when i=0, "α=−1" is calculated.

Then, in step S105, a loop 2 (where, variable is j) that designates a prediction mode taken by the block to be encoded is started.

The prediction modes that can be taken by the block to be encoded vary depending on its position in an image, and thus ψ is defined as a set of all prediction modes that can be taken by the block to be encoded. As an initial value, γ (here, γ is the smallest prediction mode number among the modes that can be taken) is assigned to j.

Then, in step S106, a predicted signal to which a gradient is applied is generated in accordance with Equation (1) using the gradient c obtained in step S104.

Then, in step S107, the rate distortion cost $J_{i,j}$ is obtained. In calculating the rate distortion cost, the following Equation (2) is used.

$$J_{i,j} = SSD + \lambda(R_{block} + R_{gradient})\qquad\text{Equation (2)}$$

Here, SSD is the sum of the squares of the absolute values of prediction errors, λ is a Lagrange multiplier for prediction mode determination, $R_{block}$ is a code amount generated when the block to be encoded is encoded in a selected prediction mode j, and $R_{gradient}$ is a code amount generated when gradient information i is encoded.

Then, in step S108, by deciding whether or not Equation (3) is satisfied, it is determined whether or not the cost $J_{i,j}$ calculated in step S107 is the minimum.

$$J_{i,j} < J_{min}\qquad\text{Equation (3)}$$

If it is decided that the cost $J_{i,j}$ calculated in step S107 is below the minimum cost $J_{min}$ according to the decision in step S108, the processing proceeds to step S109, the gradient information i and the value of the prediction mode j at that time are recorded, and $J_{min}$ is updated as in the following Equations (4) to (6).

$$\text{best\_gradient} = i\qquad\text{Equation (4)}$$

$$\text{best\_mode} = j\qquad\text{Equation (5)}$$

$$J_{min} = J_{i,j}\qquad\text{Equation (6)}$$

On the other hand, if it is decided that the cost $J_{i,j}$ calculated in step S107 is not below the minimum cost $J_{min}$ according to the decision in step S108, the process in step S109 is not performed, and the update process indicated by Equations (4) to (6) is not performed.

The above-described cost calculation process is performed in a manner in which the loop 2 is repeated in the range of j∈ψ(i.e. with respect to all prediction modes that can be taken), and when the loop 2 is ended, the next gradient[i] is selected, and the loop 1 is repeated in the range of 0≤i<n.

By executing this two kinds of loop structures, best_gradient and best_mode that realize the minimum rate distortion cost can be obtained.

Then, in step S110, information on the obtained best_gradient and best_mode is encoded. A generally used method, such as arithmetic coding, may be used as the encoding scheme. The encoding information is inserted into a header and so on.

Then, in step S111, a predicted signal to which a gradient is applied is generated using the obtained best_gradient and best_mode, and the block to be encoded is encoded.

By the above-described flow, in comparison to the conventional intraframe prediction in which all the predicted signals in the prediction direction which are included in a block to be encoded are fixed to the same value, it is possible to generate a predicted signal to which a gradient is applied and thus an prediction error can be reduced.

It is noted that although a 4×4 block has been described in the foregoing description, the concept of the present invention can be applied to sizes which are different from the size of the 4×4 block. Moreover, the present invention can be applied to not only the luminance signal but also the chrominance signal in the same manner.

Figure 5:
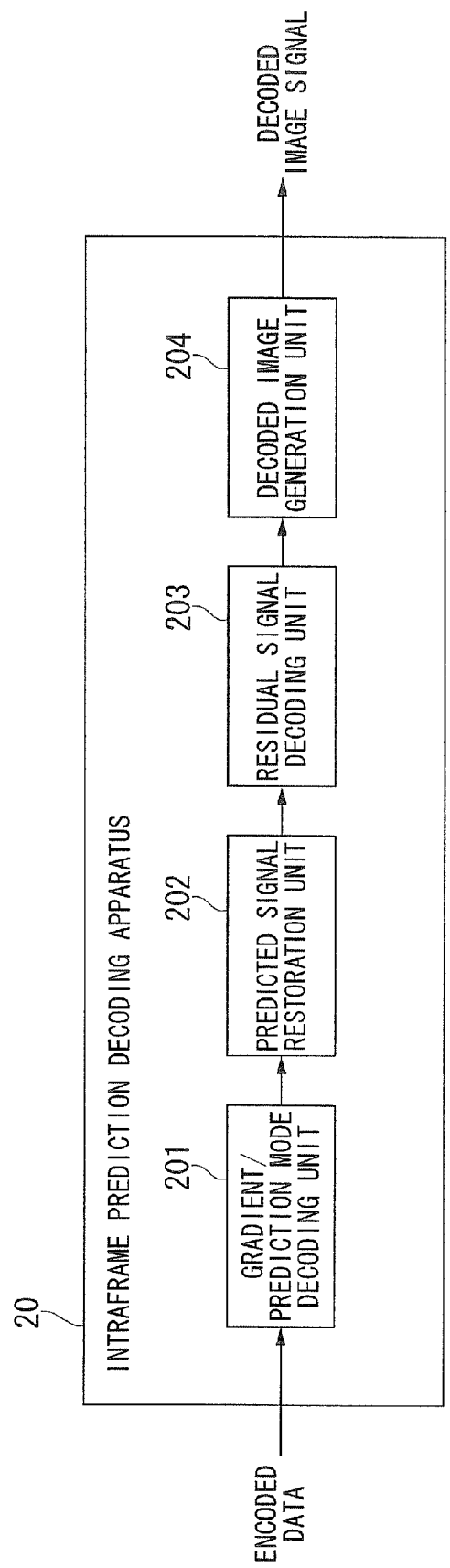
FIG. 5 is an embodiment of an intraframe prediction decoding apparatus according to the present invention.

FIG. 5 illustrates an intraframe prediction decoding apparatus 20 according to an embodiment of the present invention which decodes encoded data generated by the intraframe prediction encoding apparatus 10 configured as shown in FIG. 2.

As shown in this drawing, in order to decode the encoded data generated by the intraframe prediction encoding apparatus 10, the intraframe prediction decoding apparatus 20 includes a gradient/prediction mode decoding unit 201, a predicted signal restoration unit 202, a residual signal decoding unit 203, and a decoded image generation unit 204.

The gradient/prediction mode decoding unit 201 decodes information on the gradient and the prediction mode that is inserted into the header and so on of the encoded data.

The predicted signal restoration unit 202 restores the predicted signal to which the gradient is applied that is generated by the intraframe prediction encoding apparatus 10 based on the gradient and the prediction mode decoded by the gradient/prediction mode decoding unit 201.

The residual signal decoding unit 203 decodes the residual signal encoded by the intraframe prediction encoding apparatus 10 from the encoded data.

The decoded image generation unit 204 generates the decoded image signal based on the predicted signal restored by the predicted signal restoration unit 202 and the residual signal decoded by the residual signal decoding unit 203.

Figure 6:
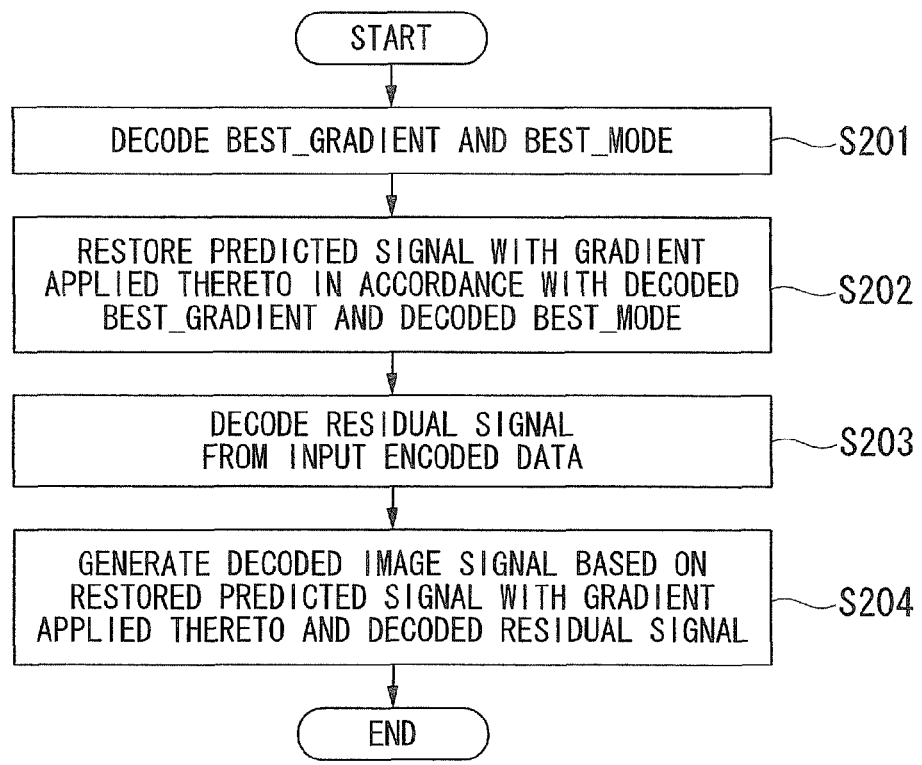
FIG. 6 is a flowchart executed by the intraframe prediction decoding apparatus according to the same embodiment.

FIG. 6 illustrates a flowchart executed by the intraframe prediction decoding apparatus 20 according to the present embodiment. Next, the process executed by the intraframe prediction decoding apparatus 20 will be described in accordance with the flowchart.

As shown in the flowchart of FIG. 6, upon input of the encoded data generated by the intraframe prediction encoding apparatus 10, in the first place, in step S201, the intraframe prediction decoding apparatus 20 according to the present embodiment decodes information of the best_gradient and best_mode inserted into the header and so on of the input encoded data.

Then, in step S202, the intraframe prediction decoding apparatus 20 restores the predicted signal to which the gradient is applied that is generated by the intraframe prediction encoding apparatus 10 in accordance with the decoded best_gradient and best_mode.

Then, in step S203, the intraframe prediction decoding apparatus 20 decodes the residual signal (i.e. the difference value between the (original) image signal and the predicted signal) encoded by the intraframe prediction encoding apparatus 10 from the input encoded data.

Then, in step S204, the intraframe prediction decoding apparatus 20 generates the decoded image signal based on the restored predicted signal to which the gradient is applied and the decoded residual signal.

As described above, the intraframe prediction decoding apparatus 20 configured as shown in FIG. 5 decodes the encoded data generated by the intraframe prediction encoding apparatus 10 configured as shown in FIG. 2.

Figure 7:
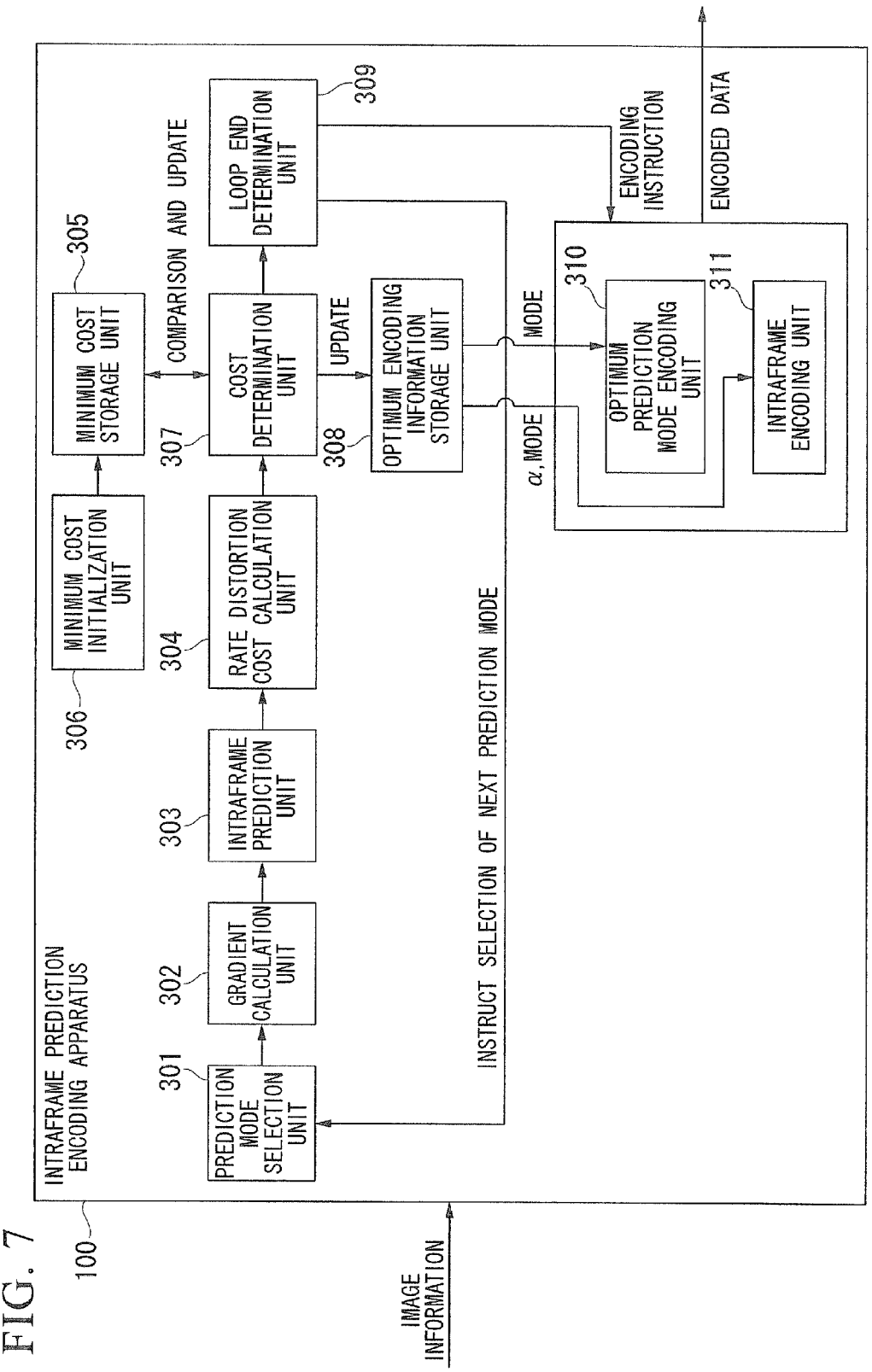
FIG. 7 is another embodiment of the intraframe prediction encoding apparatus according to the present invention.

FIG. 7 illustrates an intraframe prediction encoding apparatus 100 as another embodiment of the present invention.

As illustrated in the drawing, the intraframe prediction encoding apparatus 100 includes a prediction mode selection unit 301, a gradient calculation unit 302, an intraframe prediction unit 303, a rate distortion cost calculation unit 304, a minimum cost storage unit 305, a minimum cost initialization unit 306, a cost determination unit 307, an optimum encoding information storage unit 308, a loop end determination unit 309, an optimum prediction mode encoding unit 310, and an intraframe encoding unit 311.

The prediction mode selection unit 301 selects a prediction mode for the intraframe prediction.

The gradient calculation unit 302 calculates a gradient applied to a predicted signal based on the prediction mode selected by the prediction mode selection unit 301.

The intraframe prediction unit 303 generates a predicted signal to which a gradient is applied, which is used in the intraframe prediction, based on the prediction mode selected by the prediction mode selection unit 301 and the gradient calculated by the gradient calculation unit 302.

The rate distortion cost calculation unit 304 calculates a rate distortion cost that is an encoding cost based on the predicted signal generated by the intraframe prediction unit 303.

The minimum cost storage unit 305 stores the minimum value of the rate distortion cost calculated by the rate distortion cost calculation unit 304.

When the intraframe prediction encoding starts, the minimum cost initialization unit 306 writes an initial value of the rate distortion cost that indicates a large value into the minimum cost storage unit 305.

The cost determination unit 307 compares the rate distortion cost calculated by the rate distortion cost calculation unit 304 with the rate distortion cost stored in the minimum cost storage unit 305, and if the rate distortion cost calculated by the rate distortion cost calculation unit 304 is smaller, the cost determination unit 307 updates the rate distortion cost stored in the minimum cost storage unit 305 using the rate distortion cost calculated by the rate distortion cost calculation unit 304, and further updates information on the prediction mode and the gradient stored in the optimum encoding information storage unit 308 in accordance with the information on the prediction mode and the gradient at that time.

The optimum Encoding information storage unit 308 stores information on the optimum prediction mode and the gradient, which will be updated by the cost determination unit 307.

The loop end determination unit 309 performs control so that all the prediction modes are selected by instructing the prediction mode selection unit 301 to select the next prediction mode, and instructs the optimum prediction mode encoding unit 310 and the intraframe encoding unit 311 to perform the encoding when all of the prediction modes have been selected.

Upon receipt of an encoding instruction from the loop end determination unit 309, the optimum prediction mode encoding unit 310 reads the information on the prediction mode from the optimum encoding information storage unit 308, and encodes the information.

Upon receipt of an encoding instruction from the loop end determination unit 309, the intraframe encoding unit 311 reads the information on the prediction mode and the gradient from the optimum encoding information storage unit 308, generates a predicted signal to which a gradient is applied in accordance with the read prediction mode and gradient, and encodes a residual signal between the image signal of the block to be encoded and the generated predicted signal.

Next, the intraframe prediction that is executed by the intraframe prediction encoding apparatus 100 according to the present embodiment, which is thus constructed, will be described in accordance with FIG. 8. Here, in FIG. 8, it is assumed that the block to be encoded is a 4×4 block.

Figure 8:
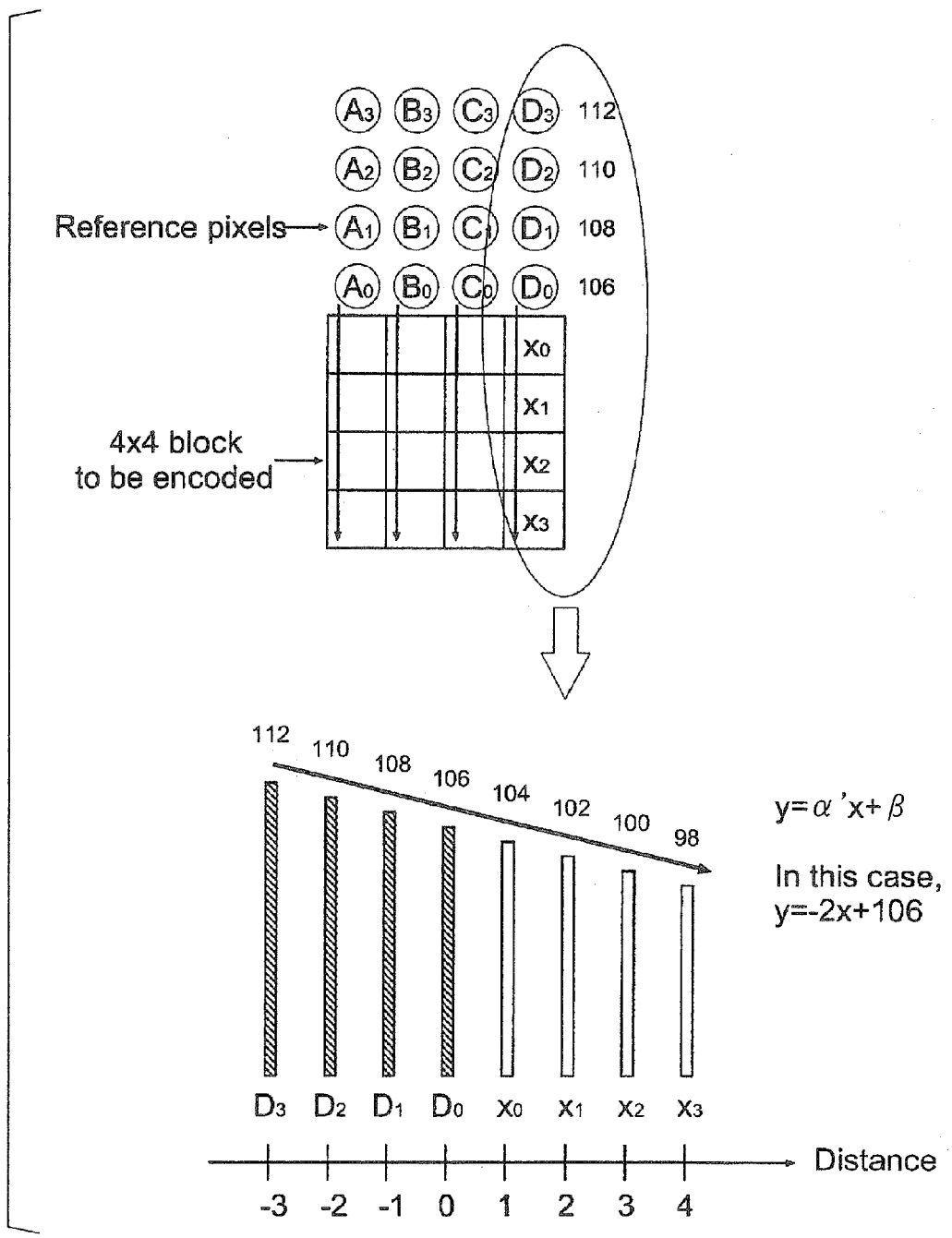
FIG. 8 is a diagram explaining an intraframe prediction executed by the intraframe prediction encoding apparatus according to the same embodiment.

To explain a concrete example of the vertical prediction mode, as shown in FIG. 8, assuming that the reference pixels closest to the block to be encoded are indicated as $A_0$ to $D_0$; the reference pixels which are disposed in increasing order of distance from the block to be encoded are indicated as $A_1, A_2, A_3, \ldots,$ and $A_k$, $B_1, B_2, B_3, \ldots,$ and $B_k$, $C_1, C_2, C_3, \ldots,$ and $C_k$, and $D_1, D_2, D_3, \ldots,$ and $D_k$; the pixel value of a predicted pixel is y; the distance from a reference pixel to the predicted pixel is x; and the pixel value of the reference pixel is $\beta$, the intraframe prediction encoding apparatus 100 according to the present embodiment estimates the pixel value y of the predicted pixel from the gradients $\alpha'$ indicated by the pixel values of these reference pixels as shown in Equation (7).

$$y = \alpha' x + \beta \hspace{2cm} \text{Equation (7)}$$

In this case, for example, the gradients $\alpha'$ may be obtained with respect to four lines of A, B, C, and D independently, and these gradients may be determined as estimation results. Alternatively, the common gradient $\alpha'$ may be obtained by calculating the average value thereof, and this common gradient may be determined as an estimation result.

In the intraframe prediction encoding apparatus 100 configured as shown in FIG. 7, the predicted signal is generated in accordance with Equation (7).

Since the estimation process of the gradient $\alpha'$ can also be executed by the image decoding side, it is not required for the intraframe prediction encoding apparatus 100 of the present invention configured as shown in FIG. 7 to notify the image decoding side of the gradient $\alpha'$. Accordingly, in comparison to the intraframe prediction encoding apparatus 10 configured as shown in FIG. 2, additional information becomes unnecessary, and thus the encoded data amount can be reduced to that extent.

Figure 9:
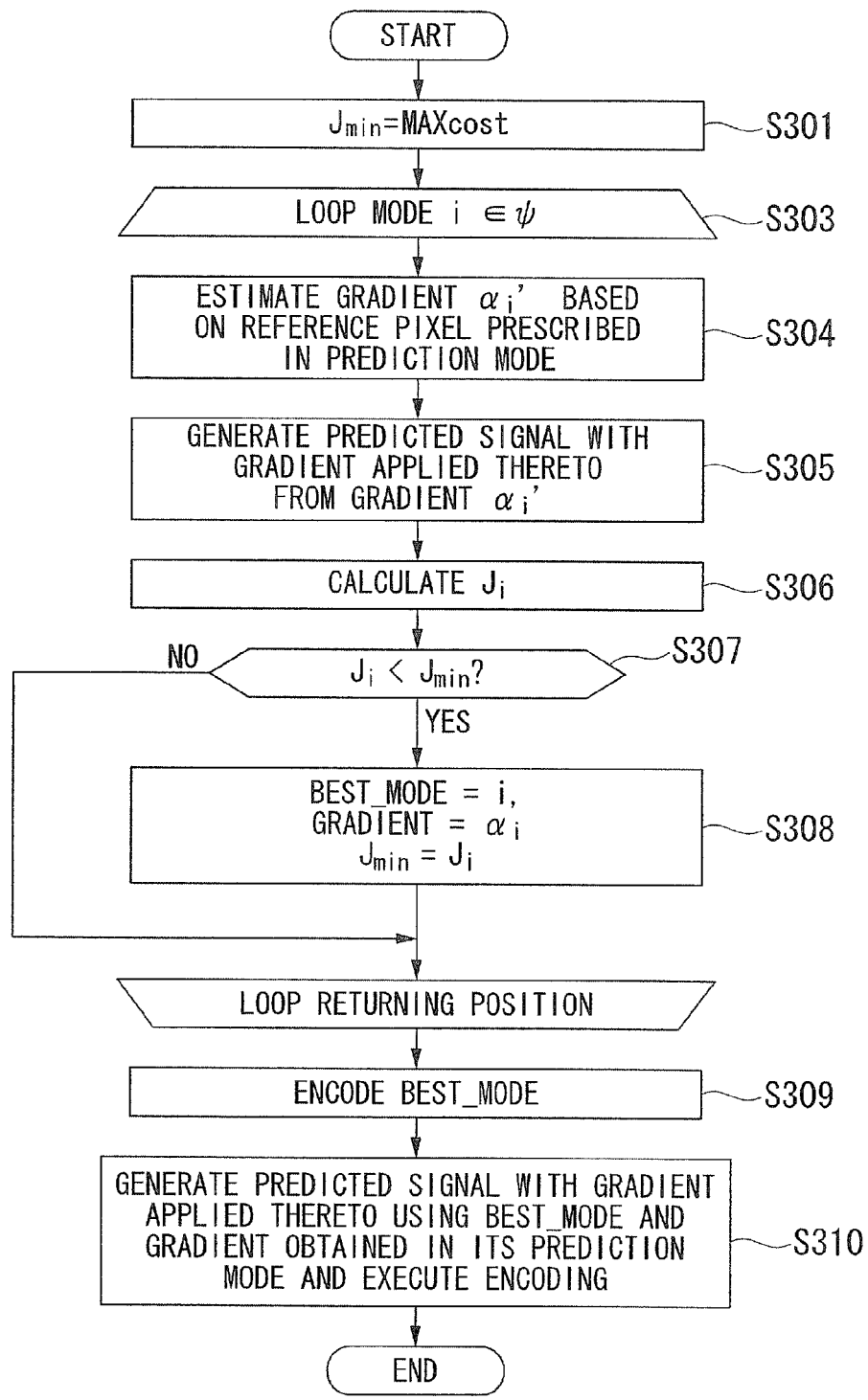
FIG. 9 is a flowchart executed by the intraframe prediction encoding apparatus according to the same embodiment.

FIG. 9 illustrates a flowchart executed by the intraframe prediction encoding apparatus 100 according to the present embodiment. The operation executed by the intraframe prediction encoding apparatus 100 will now be described in accordance with the flowchart.

If a block to be encoded which is subjected to an intraframe prediction encoding process is given, as shown in the flowchart of FIG. 9, in the first place, in step S301, the intraframe prediction encoding apparatus 100 initializes the minimum value $J_{min}$ of the rate distortion cost $J_i$ to be used in step S306 described later to MAXcost that indicates a sufficiently large value (i.e. a value which has no possibility that the rate distortion cost $J_i$ actually takes).

Then, in step S303, a loop (where, variable is i) that designates the prediction mode taken by the block to be encoded is started.

The prediction modes that can be taken by the block to be encoded vary depending on the position within an image at which the block to be encoded exists, and thus ψ is defined as a set of all prediction modes that can be taken by the block to be encoded. As an initial value, γ (where, γ is the smallest prediction mode number among the modes that can be taken) is assigned to i.

Then, in step S304, as described with reference to FIG. 8, the gradient $\alpha_i'$ for one-pixel distance is estimated using k reference pixels in the prediction direction prescribed by the selected prediction mode i. This estimation is performed using a least-square method and so on.

Then, in step S305, a predicted signal to which a gradient is applied is generated in accordance with Equation (7) using the gradient $\alpha_i'$ obtained in step S304.

Then, in step S306, a rate distortion cost $J_i$ is obtained. In calculating the rate distortion cost, the following Equation (8) is used.

$$J_i = SSD + \gamma \times R_{block} \quad \text{Equation (8)}$$

Here, SSD is the sum of the squares of the absolute values of prediction errors, λ is a Lagrange multiplier for prediction mode determination, $R_{block}$ is a code amount generated when the block to be encoded is encoded in the selected prediction mode i.

It is noted that since it is not required to encode the gradient information, it is not required to consider $R_{gradient}$, which has been considered in Equation (2), in Equation (8).

Then, in step S307, it is determined whether or not the cost $J_i$ calculated in step S306 is the minimum by deciding whether or not Equation (9) is satisfied.

$$J_i < J_{min} \quad \text{Equation (9)}$$

If it is decided that the cost $J_i$ calculated in step S306 is below the minimum cost $J_{min}$ according to the decision in step S307, the processing proceeds to step S308, the value of the prediction mode i and the gradient $\alpha_i'$ at that time are recorded, and $J_{min}$ is updated as in the following Equations (10) to (12).

$$\text{best\_mode} = i \quad \text{Equation (10)}$$

$$\text{gradient} = \alpha_i' \quad \text{Equation (11)} =$$

$$J_{min} = J_i \quad \text{Equation (12)}$$

On the other hand, if it is decided that the cost $J_i$ calculated in step S306 is not below the minimum cost $J_{min}$ according to the decision in step S307, the process in step S308 is not performed, and the update process indicated by Equations (10) to (12) is not performed.

The above-described cost calculation process is performed in a manner in which a loop for the prediction mode is repeated within the range of i∈ψ(i.e. with respect to all prediction modes that can be taken).

By executing this loop, the best_mode that realizes the minimum rate distortion cost and the gradient α' in the prediction mode are obtained.

Then, in step S309, only the obtained best_mode is encoded. A generally used method, such as arithmetic coding, may be used as an encoding scheme. The encoding information is inserted into a header and so on.

Then, in step S310, a predicted signal to which a gradient is applied is generated using the obtained best_mode and the gradient α', and the block to be encoded is encoded.

Conventionally, all the predicted signals in the prediction direction are fixed to the same value, but by the above-described flow, it is possible to generate a predicted signal to which a gradient is applied, and thus prediction error can be reduced.

It is noted that although a 4×4 block has been described in the foregoing description, the concept of the present invention can be applied to sizes which are different from the size of the 4×4 block. Moreover, the present invention can be applied to not only the luminance signal but also the chrominance signal in the same manner.

Figure 10:
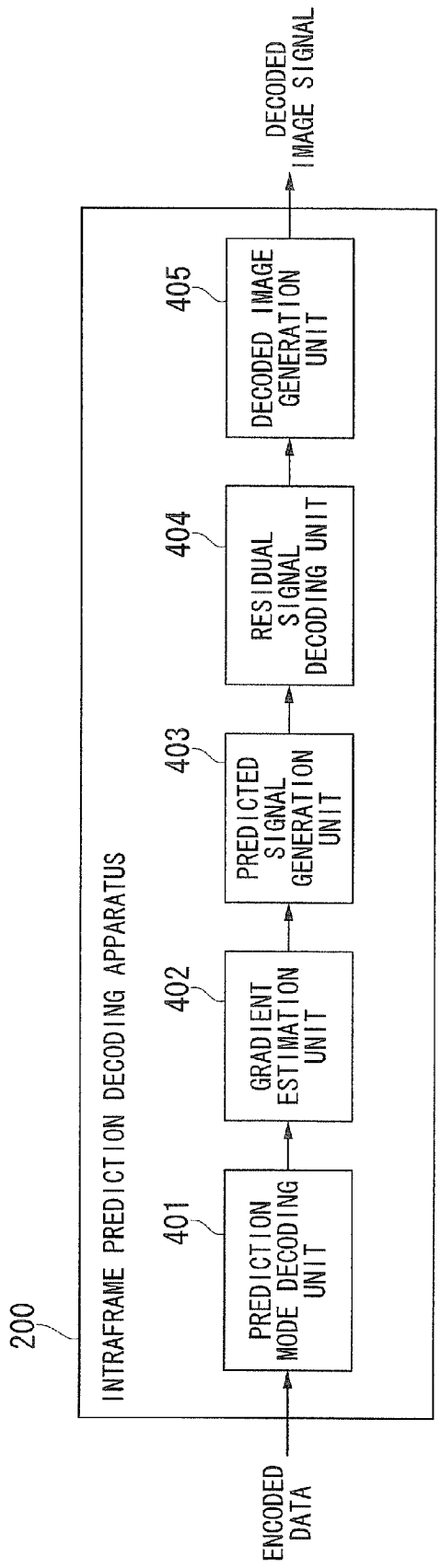
FIG. 10 is another embodiment of the intraframe prediction decoding apparatus according to the present invention.

FIG. 10 illustrates an intraframe prediction decoding apparatus 200 according to an embodiment of the present invention that decodes the encoded data generated by the intraframe prediction encoding apparatus 100 according to the present embodiment configured as shown in FIG. 7.

In order to decode the encoded data generated by the intraframe prediction encoding apparatus 100, as shown in the drawing, the intraframe prediction decoding apparatus 200 includes a prediction mode decoding unit 401, a gradient estimation unit 402, a predicted signal generation unit 403, a residual signal decoding unit 404, and a decoded image generation unit 405.

The prediction mode decoding unit 401 decodes information on the prediction mode inserted into a header and so on of the encoded data.

The gradient estimation unit 402 estimates the gradient of the predicted signal estimated by the intraframe prediction encoding apparatus 100 by executing the same estimation algorithm as that of the intraframe prediction encoding apparatus 100 based on the reference pixels prescribed by the prediction mode that is decoded by the prediction mode decoding unit 401.

The predicted signal generation unit 403 generates the predicted signal to which the gradient is applied which is generated by the intraframe prediction encoding apparatus 100 based on the prediction mode decoded by the prediction mode decoding unit 401 and the gradient estimated by the gradient estimation unit 402.

The residual signal decoding unit 404 decodes the residual signal encoded by the intraframe prediction encoding apparatus 100 from the encoded data.

The decoded image generation unit 405 generates the decoded image signal based on the predicted signal generated by the predicted signal generation unit 403 and the residual signal decoded by the residual signal decoding unit 404.

Figure 11:
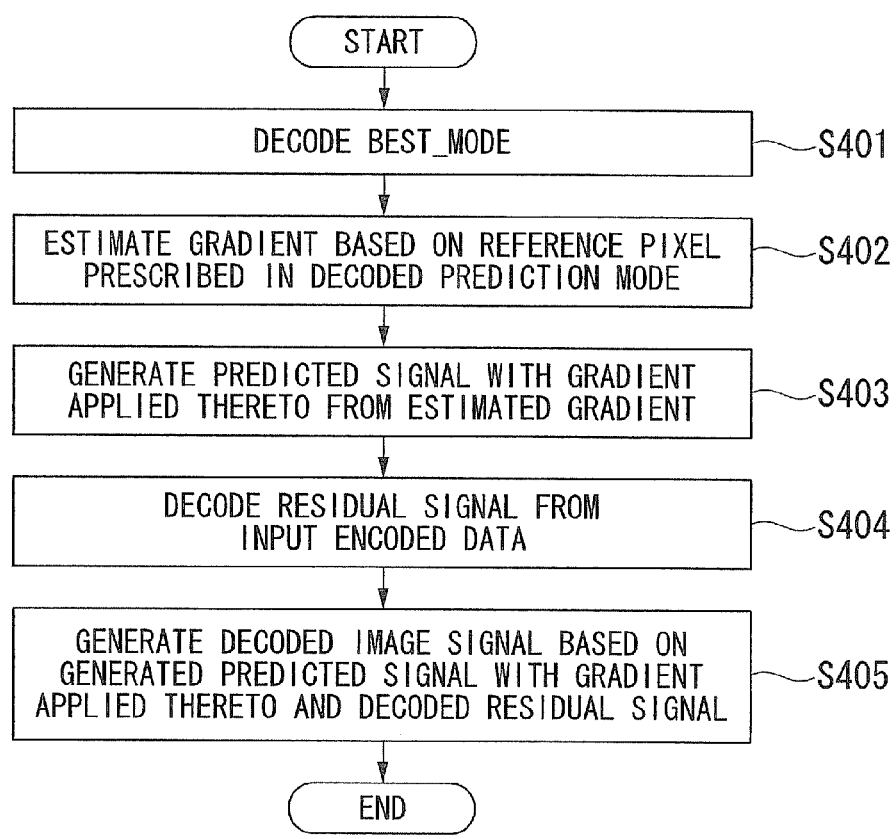
FIG. 11 is a flowchart executed by the intraframe prediction decoding apparatus according to the same embodiment.

FIG. 11 illustrates a flowchart executed by the intraframe prediction decoding apparatus 200 according to the present embodiment. The process executed by the intraframe prediction decoding apparatus 200 will now be described in accordance with the flowchart.

Upon input of the encoded data generated by the intraframe prediction encoding apparatus 100, as shown in the flowchart of FIG. 11, in step S401, the intraframe prediction decoding apparatus 200 according to the present embodiment decodes information on best_mode inserted into the header and so on of the input encoded data.

Then, in step S402, by executing the same estimation algorithm as that of the intraframe prediction encoding apparatus 100 based on the reference pixels prescribed by the decoded best_mode, the gradient of the predicted signal estimated by the intraframe prediction encoding apparatus 100 is estimated.

Then, in step S403, the predicted signal to which the gradient is applied generated by the intraframe prediction encoding apparatus 100 is generated in accordance with the decoded best_mode and the estimated gradient.

Then, in step S404, the residual signal (i.e. the difference between the (original) image signal and the predicted signal) encoded by the intraframe prediction encoding apparatus 100 is decoded from the input encoded data.

Then, in step S405, the decoded image signal is generated based on the generated predicted signal to which the gradient is applied and the decoded residual signal.

As described above, the intraframe prediction decoding apparatus 200 configured as shown in FIG. 10 decodes the encoded data generated by the intraframe prediction encoding apparatus 100 configured as shown in FIG. 7.

Although the intraframe prediction encoding apparatus 100 shown in FIG. 7 adopts the construction in which the optimum prediction mode encoding unit 310 is provided and, as described in step S309 in the flowchart of FIG. 9, the optimum prediction mode encoding unit 310 reads only best_mode from the optimum encoding information storage unit 308, and decodes the read best_mode, it is also possible to adopt a construction in which the optimum prediction mode encoding unit 310 reads the best_mode and the gradient α' from the optimum encoding information storage unit 308 and decodes the read best_mode and gradient α'.

Figure 12:
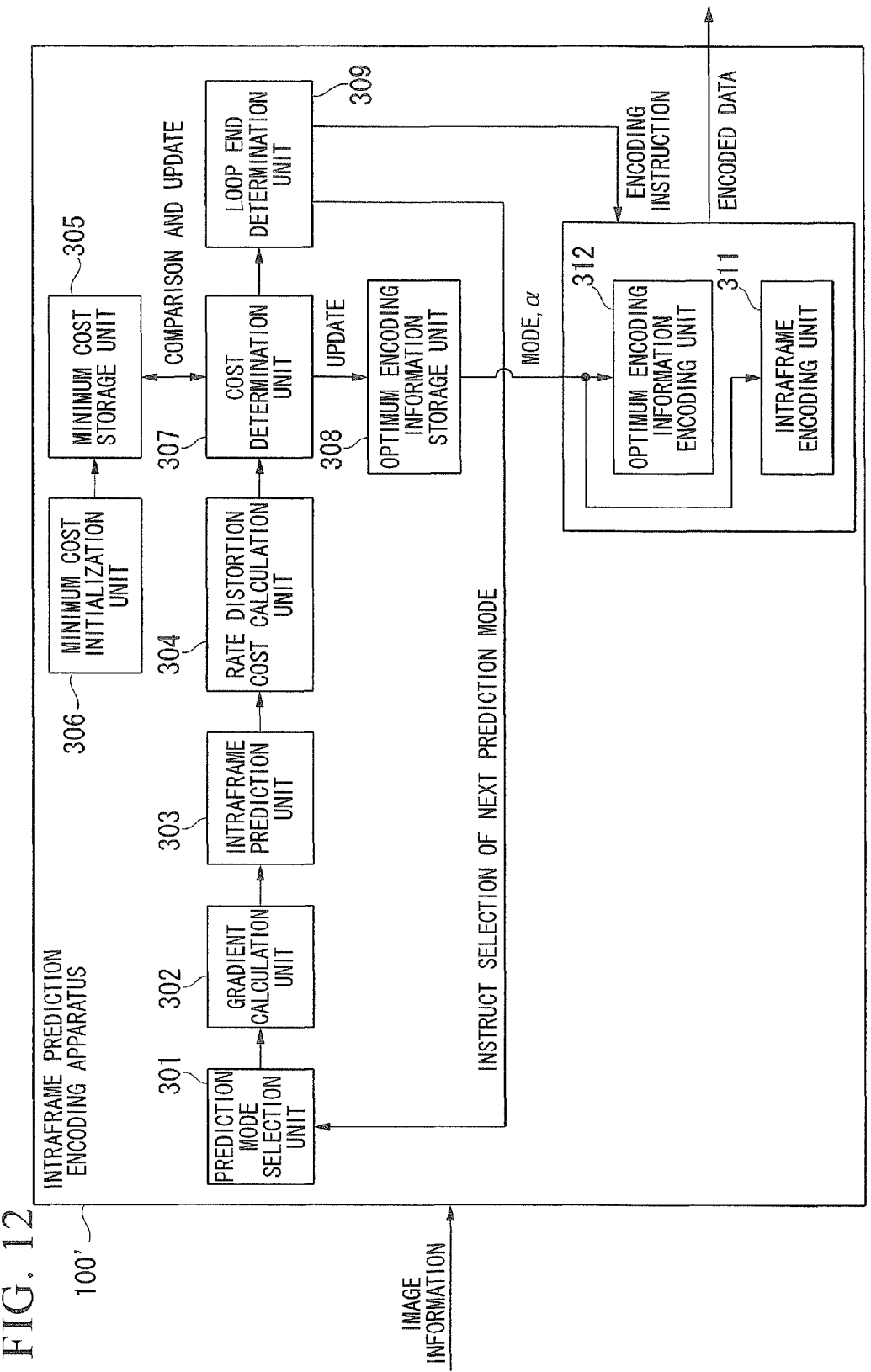
FIG. 12 is still another embodiment of the intraframe prediction encoding apparatus according to the present invention.
Figure 13:
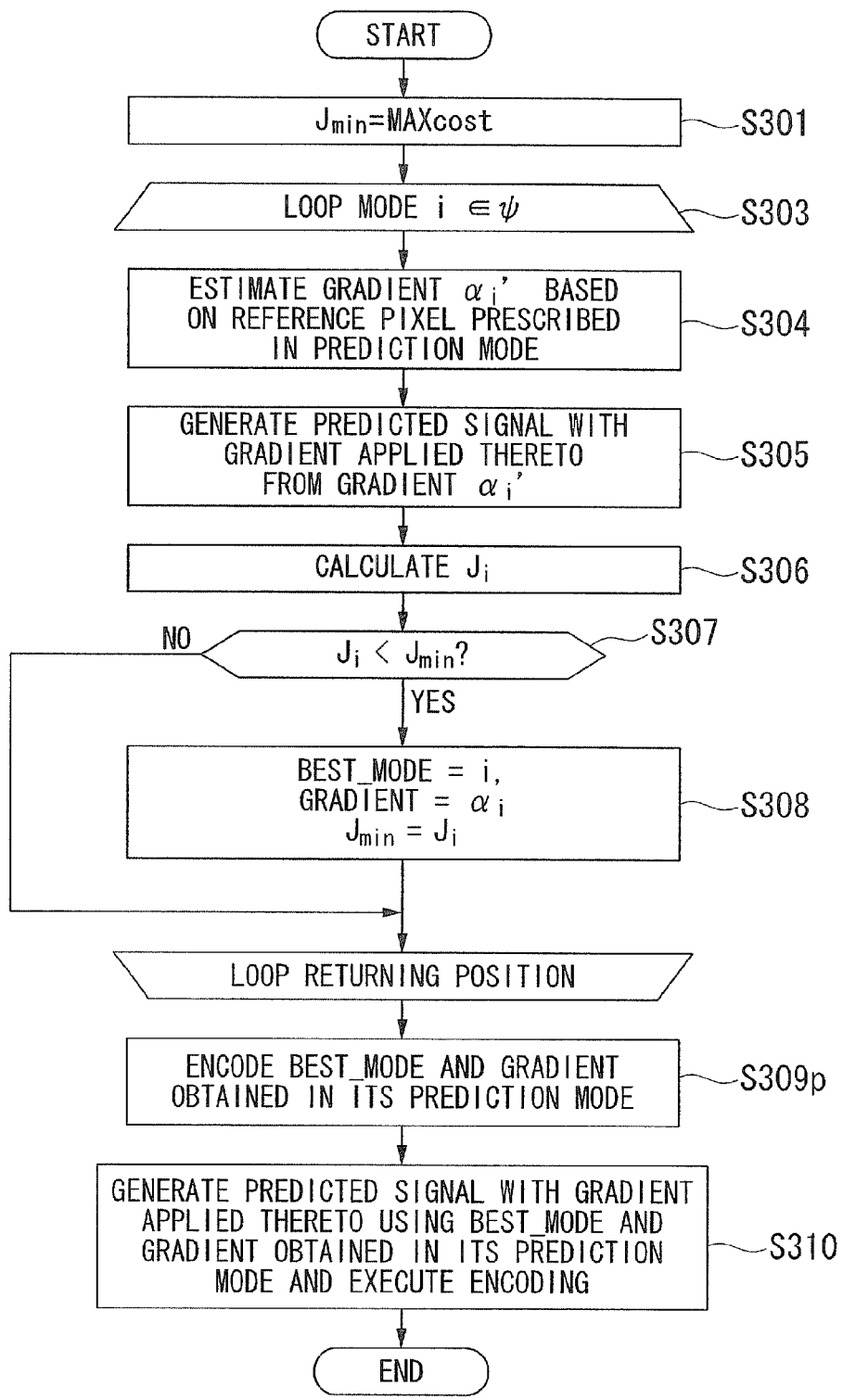
FIG. 13 is a flowchart executed by the intraframe prediction encoding apparatus according to the same embodiment.

In the case of adopting this construction, as shown in FIG. 12, the optimum encoding information encoding unit 312 is provided instead of the optimum prediction mode encoding unit 310, and as described in step S309p of the flowchart in FIG. 13 (which corresponds to the flowchart of FIG. 9), the optimum encoding information encoding unit 312 reads the best_mode and the gradient α' from the optimum encoding information storage unit 308, and encodes the read best_mode and gradient α'.

Moreover, in the case of adopting this construction, since the value of the gradient α' is reported to the image decoding side, the intraframe prediction decoding apparatus 20 as shown in FIG. 5 is used instead of the intraframe prediction decoding apparatus 200 as shown in FIG. 10.

Next, experiments performed to verity the effectiveness of the intraframe prediction encoding apparatus 10 configured as shown in FIG. 2 will be described.

The experiments were performed in a manner in which five kinds of gradient constants α=2, 4, 6, 8, and 10 were prepared, 11 kinds of gradient adjustment coefficients gradient[11]={−1.0, −0.8, −0.6, −0.4, −0.2, 0, 0.2, 0.4, 0.6, 0.8, 1.0} were determined with respect to the respective gradient constants, and the frequency that the respective gradients were selected was investigated by obtaining its selection probability distribution.

Figure 14:
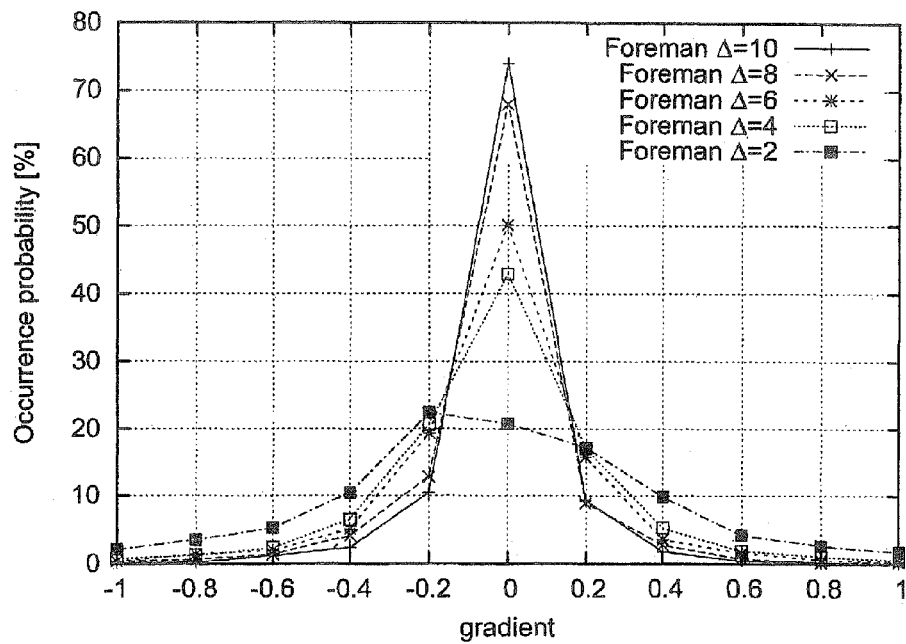
FIG. 14 is a diagram explaining the result of experiments for verifying the effectiveness of the intraframe prediction encoding apparatus in FIG. 2.
Figure 15:
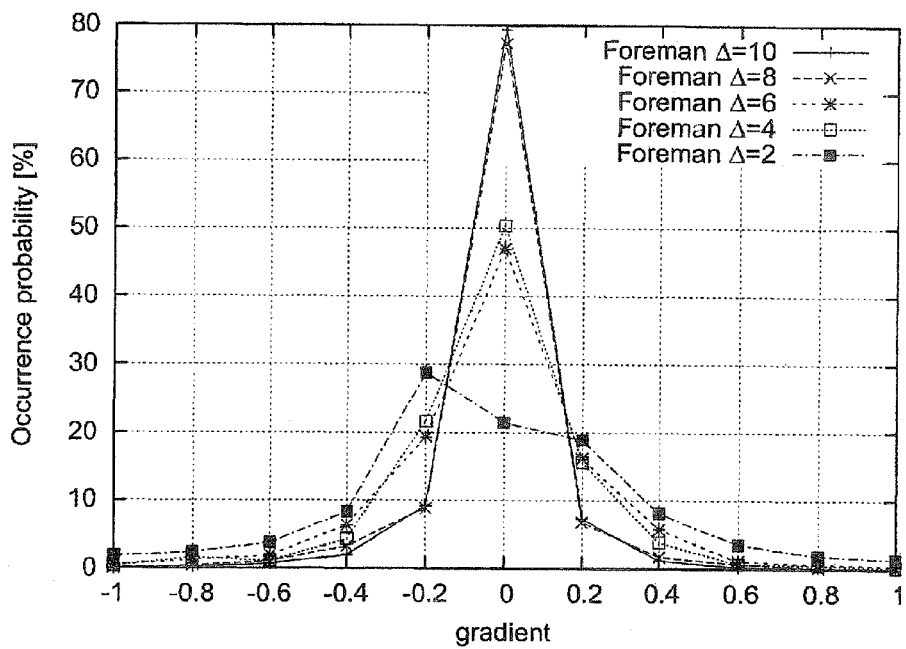
FIG. 15 is also a diagram explaining the result of experiments.

FIGS. 14 and 15 illustrate the results of experiments. Here, the experimental conditions are as follows.

Used software: KTA (Key Technical Area) ver. 1.4
  KTA is reference software for a next generation encoding scheme
  http://iphome.hhi.de/suehring/tml/download/KTA/
Profile (which prescribes the function of an encoding tool)
  High profile
The number of encoded frames: the first frame of each image (intraframe prediction encoding, I picture)
QP (Quantization Parameter) values
  12 and 27
Kind of image: Foreman (standard image)
Image size: QCIF (176×144 pixels)
Used block size: 4×4

The horizontal axis in FIGS. 14 and 15 represents a gradient adjustment coefficient determined as an optimum amount, and the vertical axis represents its selection probability.

Here, FIG. 14 illustrates the result of experiments in the case of QP=12, and FIG. 15 illustrates the result of experiments in the case of QP=27.

In FIGS. 14 and 15, the gradient is not applied when gradient=0, and thus it corresponds to a conventional scheme. The probability that the conventional scheme is adopted is varied depending on Δ.

In the case of Δ=8 and 10, the selection ratio of the conventional scheme is about 80%. Moreover, in the case of Δ=4 and 6, the selection ratio of the conventional scheme is about 50%, and in the case of Δ=2, the selection ratio of the conventional scheme is about 20%.

That is, the scheme according to the present invention is selected with a selection ratio of about 80% in the case of Δ=2, about a half in the case of Δ=4 and 6, and about 20% in the case of Δ=8 and 10. Since there is no great difference between tendencies in FIGS. 14 and 15, it can be understood that the tendencies will not be changed even if the QP is changed.

From the results of experiments as indicated above, it is considered that the QP value exerts no great effect upon the selection ratios of the convention scheme and the scheme according to the present invention, but the QP value is dependent upon Δ adopted.

It can be confirmed that the scheme according to the present invention is selected in the range of about 20 to 80% even if Δ is changed. In the case in which the code amount of the gradient information is not considered, it can be recognized that the rate distortion characteristics are clearly improved.

Then, in the intraframe prediction encoding apparatus 10 configured as shown in FIG. 2, three kinds of encoding performances by (1) a conventional scheme, (2) a scheme according to the present invention without the gradient information amount taken into consideration (in the case in which the code amount of the gradient information is not considered), and (3) a scheme according to the present invention with the gradient information amount taken into consideration (in the case in which the code amount of the gradient information is considered) were compared with one another.

Figure 16:
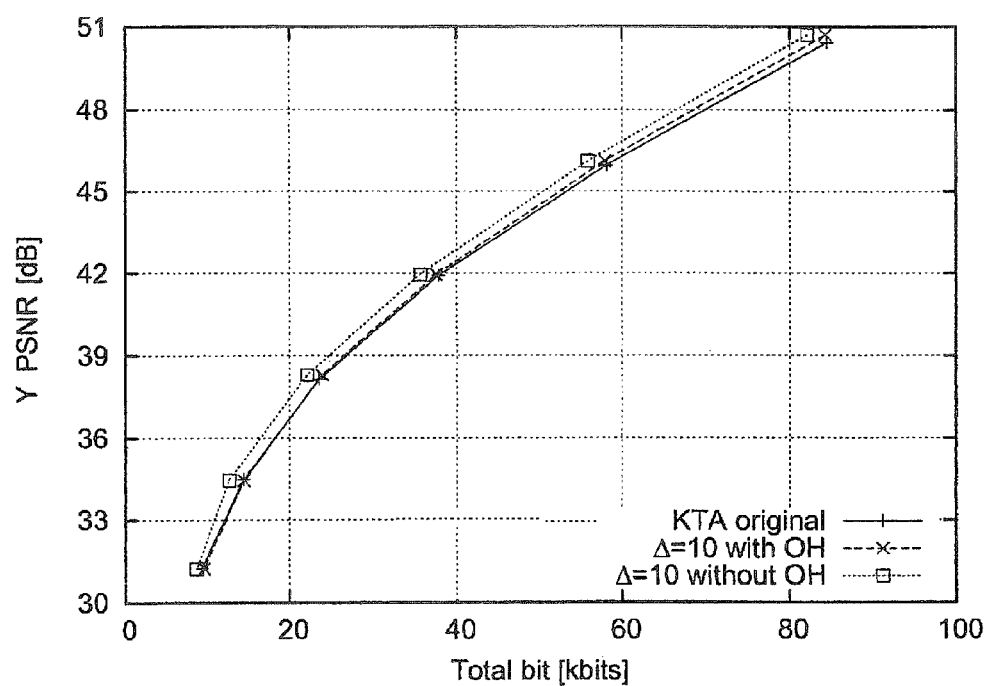
FIG. 16 is also a diagram explaining the result of experiments.

FIG. 16 illustrates the result of experiments. Here, the experimental conditions are the same as those as described above except for the gradient constant of Δ=10 and QP=12, 17, 22, 27, 32, and 37.

In FIG. 16, "KTA original" indicates the experimental result according to the conventional scheme, "Δ=10 without OH" indicates the experimental result according to the scheme of the present invention without the gradient information amount taken into consideration, and "Δ=10 with OH" indicates the experimental result according to the scheme of the present invention with the gradient information amount taken into consideration.

It is noted that the obtained gradient information amount is calculated by measuring 0th-order entropy (i.e. the lower limit of the number of bits (the ideal number of bits) required to encode the information without loss) from the selection probability distribution of the respective images to be encoded as shown in FIGS. 14 and 15.

Here, the above described schemes were compared with one another by obtaining the PSNR (Peak Signal to Noise Ratio) and the bit rate thereof ("Y PSNR" indicates the PSNR of a luminance signal)

Here, with respect to PSNR, a log value (i.e. processing result) of the KTA software was used.

As can be understood from the experimental results, the scheme according to the present invention without the gradient information amount taken into consideration always has a better performance than that according to the conventional scheme. However, the scheme according to the present invention with the gradient information amount taken into consideration frequently shows a better performance than that according to the conventional scheme, but sometimes it is slightly deteriorated in comparison to the conventional scheme.

In the case in which the information amount of the whole encoding (horizontal axis) is increased (i.e. under a high-bit rate condition), the advantageous effect of the present invention is increased. This is conceivable because the ratio of the gradient information amount becomes relatively lower.

From the above-described results, it can be demonstrated that in comparison to the conventional scheme, the present invention can obtain an improvement in the rate distortion characteristics under high-bit rate conditions.

In addition, in order to verify the effectiveness of the intraframe prediction encoding apparatus 10 configured as shown in FIG. 2 using diverse images, experiments were performed in a manner in which the gradient constants of $\Delta=2$ and 10 were prepared, 11 kinds of gradient adjustment coefficients of gradient[11]={−1.0, −0.8, −0.6, −0.4, −0.2, 0, 0.2, 0.4, 0.6, 0.8, 1.0} were determined with respect to the respective gradient constants, and the PSNR and bit rates were obtained with respect to the present invention and the conventional scheme and were compared with each other under the following experimental conditions:

Used software: KTA (Key Technical Area) ver. 1.4
Profile: High profile
The number of encoded frames: the first frame of each image (intraframe prediction encoding, I picture)
QP values: 7, 12, 17, and 22
Kind of image: Container, Foreman, Silent, Paris, Mobile, Tempete, Whale Show, and Crowded Crosswalk (all are standard images)
Image sizes: QCIF, CIF (352×288 pixels), and SD (720×480 pixels)
Used block sizes: 4×4 and 8×8

FIGS. 17A to 35 illustrate the results of experiments. It is noted that in the experiments with respect to the present invention, the bit rate was obtained with the gradient information amount taken into consideration. In addition, the solid lines indicate the experimental results according to the present invention, and the dotted lines ("Original") indicate the experimental results according to the conventional scheme.

Moreover, $\Delta$PSNR and $\Delta$Bitrate, which indicate the average values of the differences between the experimental result according to the scheme of the present invention and the experimental result according to the conventional scheme, were calculated using the standard calculation procedure described in the following reference document.

[Reference Document] G. Bjontegaard, "Calculation of average PSNR differences between RD-Curves," ITU-TQ.6/SG16 VCEG, VCEG-M33, March, 2001.

Figure 17A:
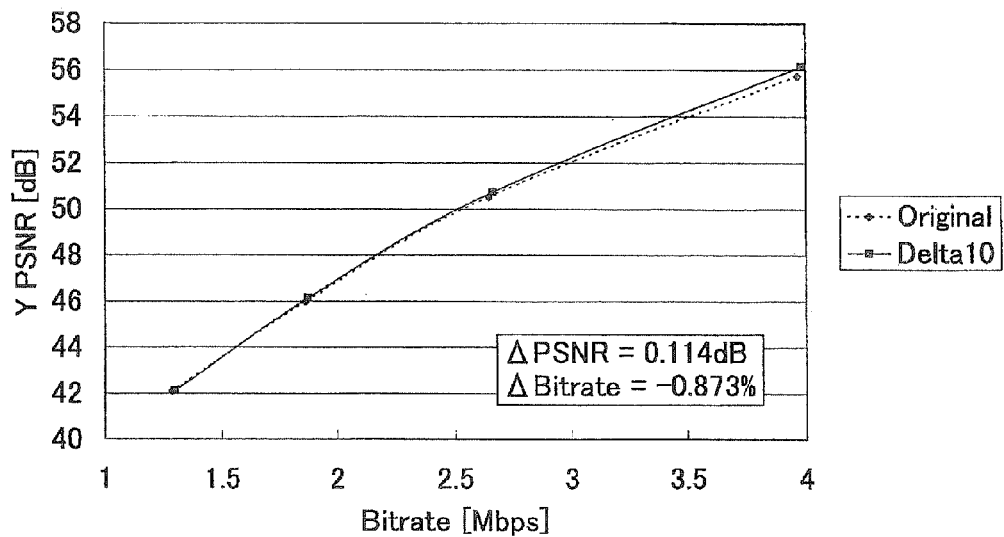
FIG. 17A is also a diagram explaining the result of experiments.
Figure 17B:
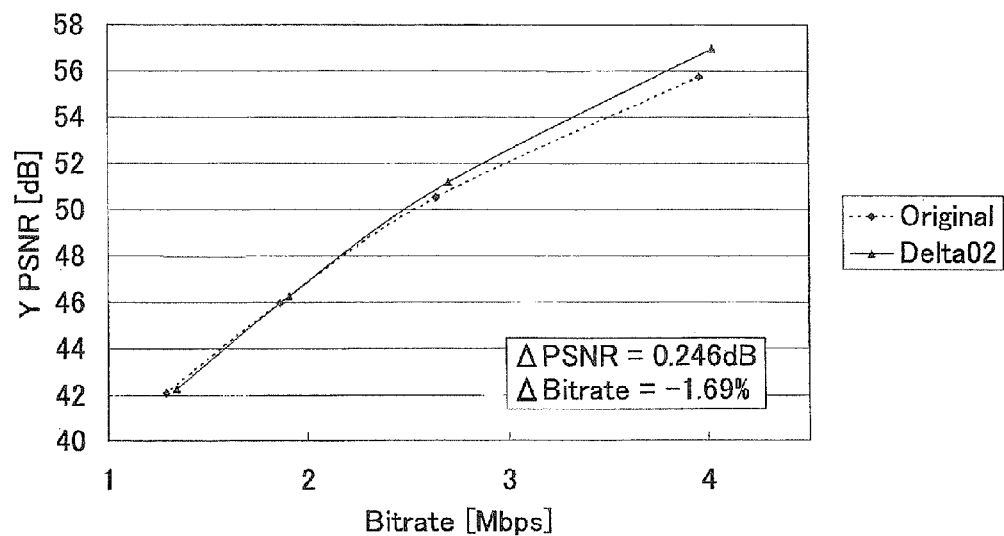
FIG. 17B is also a diagram explaining the result of experiments.

(1) Experimental Results in FIGS. 17A and 17B

FIGS. 17A and 17B illustrate the experimental results in the case in which the kind of image is "Container", the image size is QCIF, and the block size is 4×4. FIG. 17A illustrates the experimental results in the case of $\Delta=10$, and FIG. 17B illustrates the experimental results in the case of $\Delta=2$.

According to the present invention, in comparison to the conventional scheme, the experimental results in FIG. 17A show an image quality improvement of 0.114 dB on average with respect to PSNR and a generated code amount reduction of 0.873% on average with respect to the bit rate.

In addition, according to the present invention, in comparison to the conventional scheme, the experimental results in FIG. 17B show an image quality improvement of 0.246 dB on average with respect to PSNR and a generated code amount reduction of 1.69% on average with respect to the bit rate.

Figure 18A:
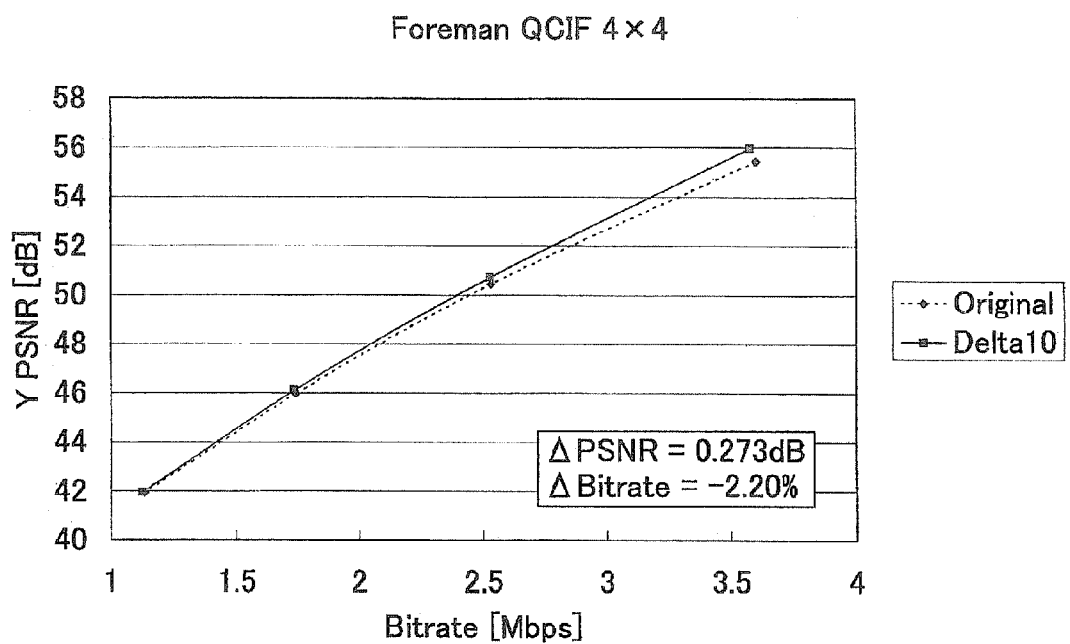
FIG. 18A is also a diagram explaining the result of experiments.
Figure 18B:
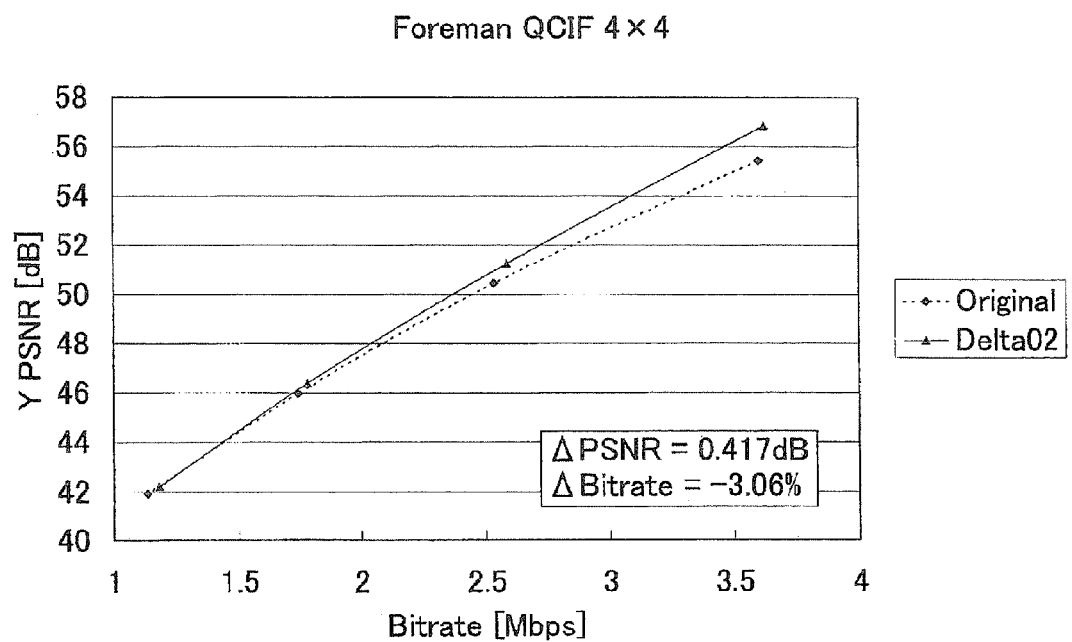
FIG. 18B is also a diagram explaining the result of experiments.

(2) Experimental Results in FIGS. 18A and 18B

FIGS. 18A and 18B illustrate the experimental results in the case in which the kind of image is "Foreman", the image size is QCIF, and the block size is 4×4. FIG. 18A illustrates the experimental results in the case of $\Delta=10$, and FIG. 18B illustrates the experimental results in the case of $\Delta=2$.

According to the present invention, in comparison to the conventional scheme, the experimental results in FIG. 18A show an image quality improvement of 0.273 dB on average with respect to PSNR and a generated code amount reduction of 2.20% on average with respect to the bit rate.

In addition, according to the present invention, in comparison to the conventional scheme, the experimental results in FIG. 18B show an image quality improvement of 0.417 dB on average with respect to PSNR and a generated code amount reduction of 3.06% on average with respect to the bit rate.

Figure 19A:
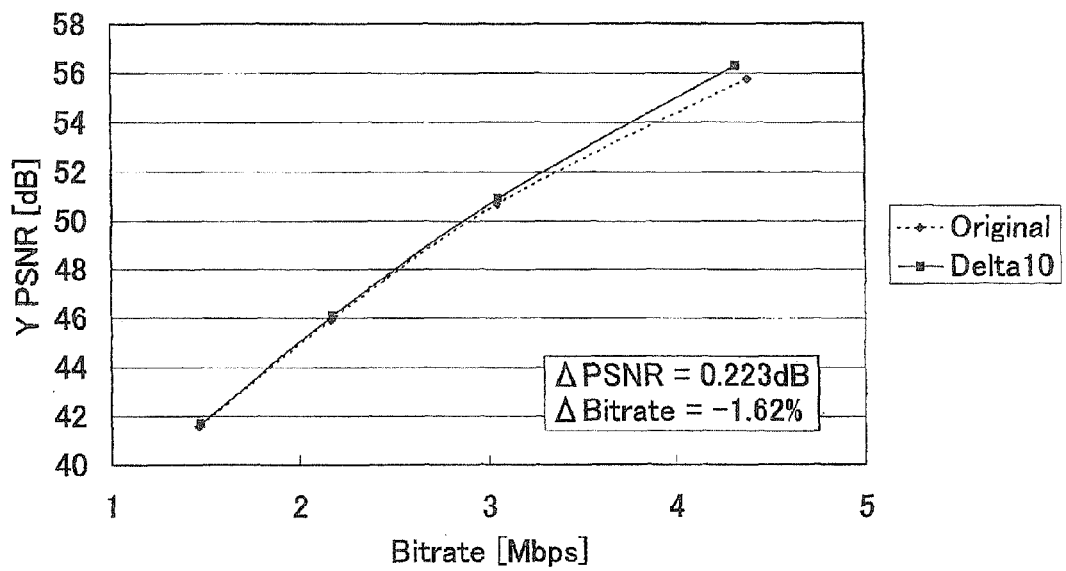
FIG. 19A is also a diagram explaining the result of experiments.
Figure 19B:
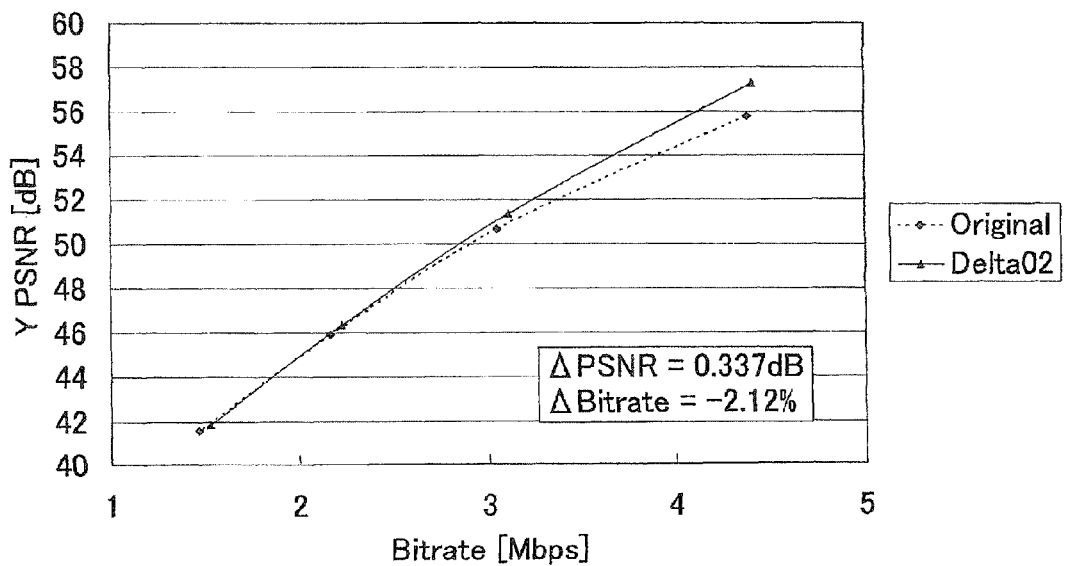
FIG. 19B is also a diagram explaining the result of experiments.

(3) Experimental Results in FIGS. 19A and 19B

FIGS. 19A and 19B illustrate the experimental results in the case in which the kind of image is "Silent", the image size is QCIF, and the block size is 4×4. FIG. 19A illustrates the experimental results in the case of $\Delta=10$, and FIG. 19B illustrates the experimental results in the case of $\Delta=2$.

According to the present invention, in comparison to the conventional scheme, the experimental results in FIG. 19A show an image quality improvement of 0.223 dB on average with respect to PSNR and a generated code amount reduction of 1.62% on average with respect to the bit rate.

In addition, according to the present invention, in comparison to the conventional scheme, the experimental results in FIG. 19B show an image quality improvement of 0.337 dB on average with respect to PSNR and a generated code amount reduction of 2.12% on average with respect to the bit rate.

Figure 20A:
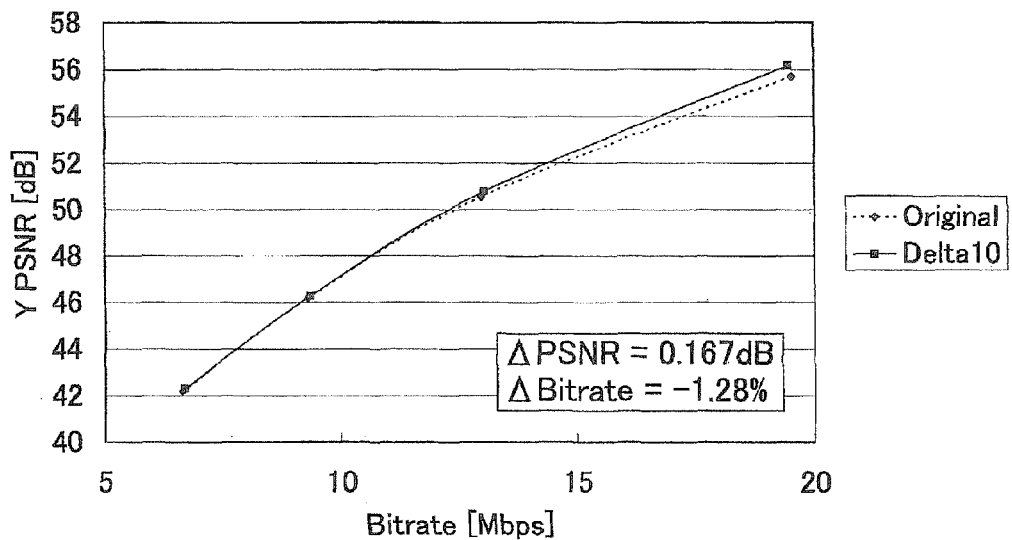
FIG. 20A is also a diagram explaining the result of experiments.
Figure 20B:
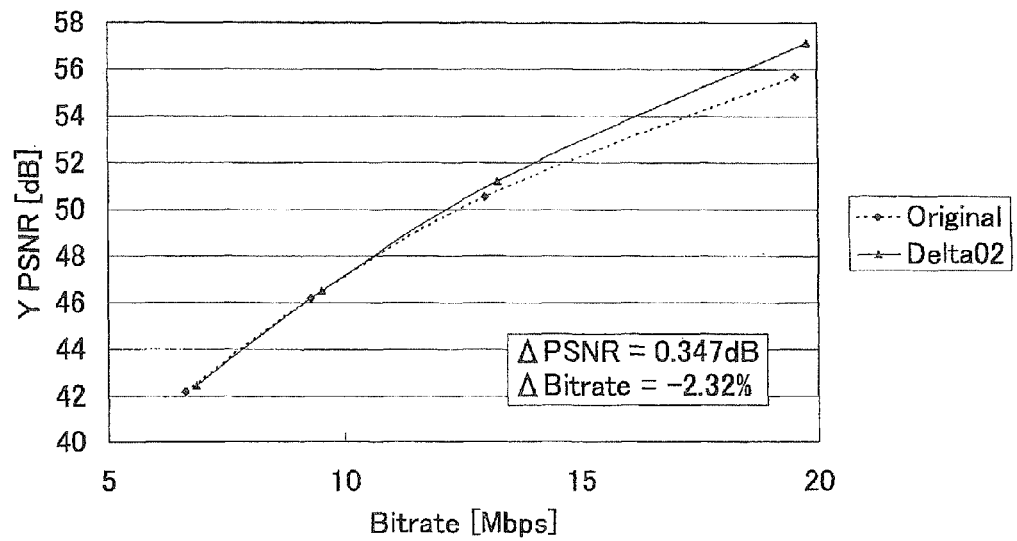
FIG. 20B is also a diagram explaining the result of experiments.

(4) Experimental Results in FIGS. 20A and 20B

FIGS. 20A and 20B illustrate the experimental results in the case in which the kind of image is "Paris", the image size is CIF, and the block size is 4×4. FIG. 20A illustrates the experimental results in the case of $\Delta=10$, and FIG. 20B illustrates the experimental results in the case of $\Delta=2$.

According to the present invention, in comparison to the conventional scheme, the experimental results in FIG. 20A show an image quality improvement of 0.167 dB on average with respect to PSNR and a generated code amount reduction of 1.28% on average with respect to the bit rate.

In addition, according to the present invention, in comparison to the conventional scheme, the experimental results in FIG. 20B show an image quality improvement of 0.347 dB on average with respect to PSNR and a generated code amount reduction of 2.32% on average with respect to the bit rate.

Figure 21A:
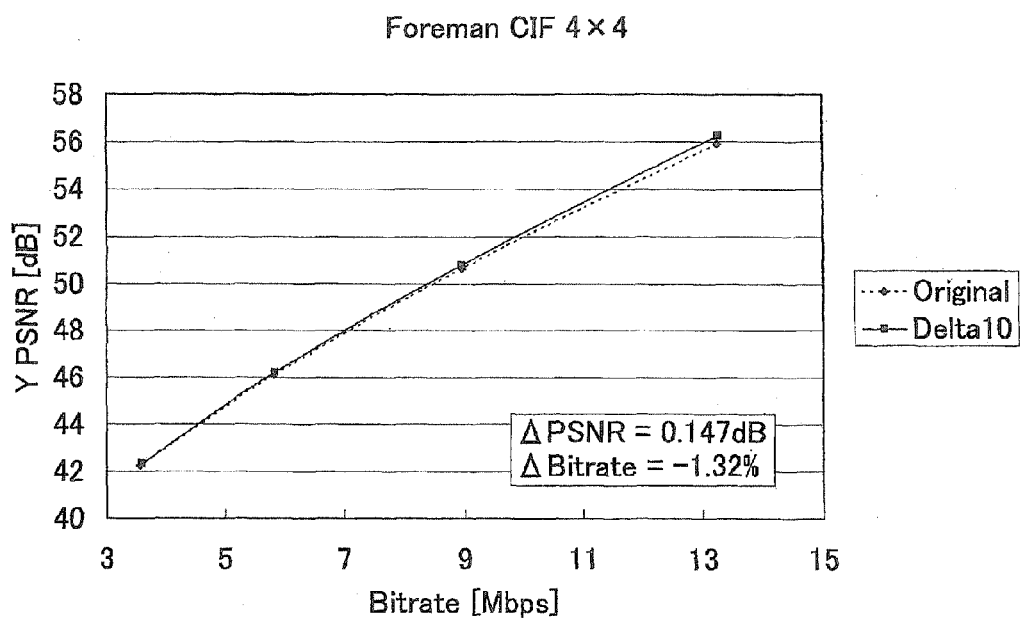
FIG. 21A is also a diagram explaining the result of experiments.
Figure 21B:
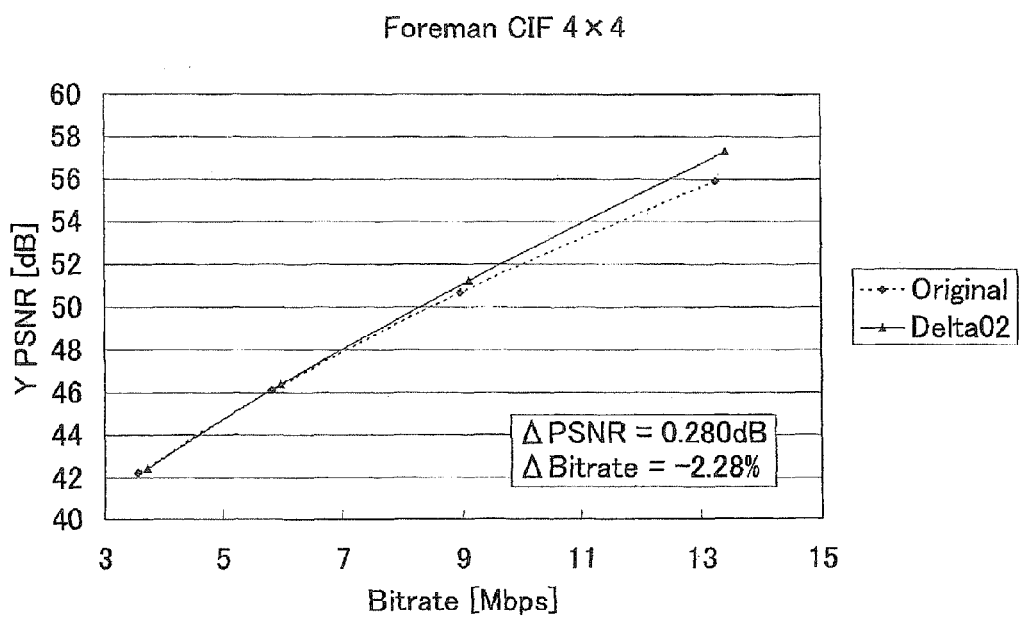
FIG. 21B is also a diagram explaining the result of experiments.

(5) Experimental Results in FIGS. 21A and 21B

FIGS. 21A and 21B illustrate the experimental results in the case in which the kind of image is "Foreman", the image size is CIF, and the block size is 4×4. FIG. 21A illustrates the experimental results in the case of $\Delta=10$, and FIG. 21B illustrates the experimental results in the case of $\Delta=2$.

According to the present invention, in comparison to the conventional scheme, the experimental results in FIG. 21A show an image quality improvement of 0.147 dB on average with respect to PSNR and a generated code amount reduction of 1.32% on average with respect to the bit rate.

In addition, according to the present invention, in comparison to the conventional scheme, the experimental results in FIG. 21B show an image quality improvement of 0.280 dB on average with respect to PSNR and a generated code amount reduction of 2.28% on average with respect to the bit rate.

Figure 22A:
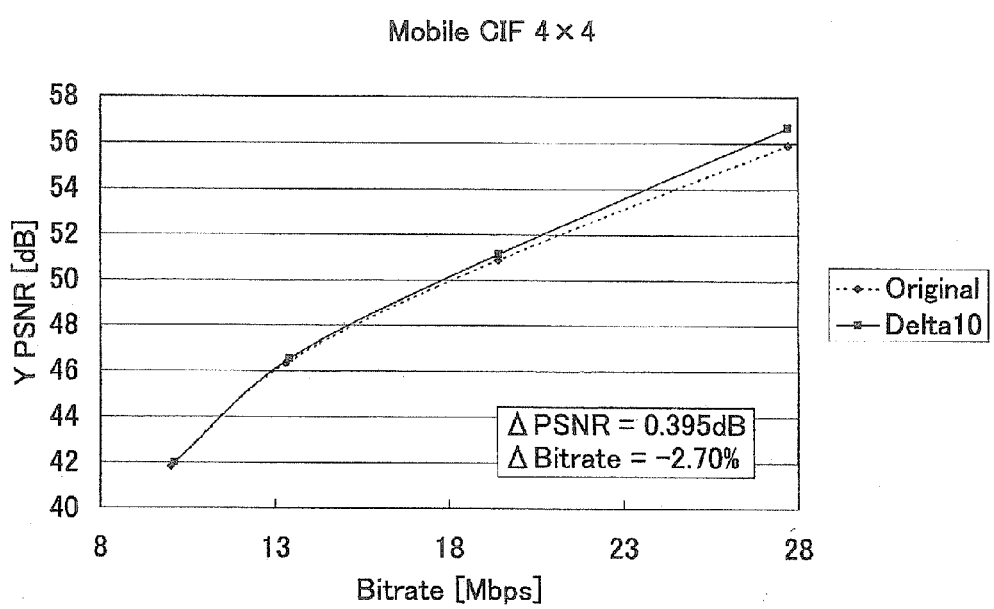
FIG. 22A is also a diagram explaining the result of experiments.
Figure 22B:
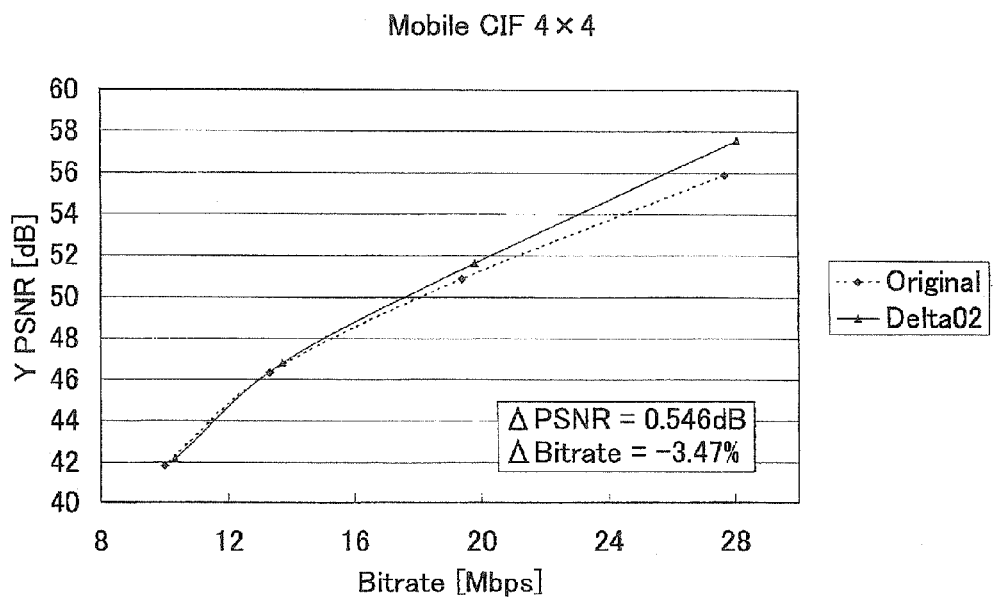
FIG. 22B is also a diagram explaining the result of experiments.

(6) Experimental Results in FIGS. 22A and 22B

FIGS. 22A and 22B illustrate the experimental results in the case in which the kind of image is "Mobile", the image size is CIF, and the block size is 4×4. FIG. 22A illustrates the experimental results in the case of $\Delta=10$, and FIG. 22B illustrates the experimental results in the case of $\Delta=2$.

According to the present invention, in comparison to the conventional scheme, the experimental results in FIG. 22A show an image quality improvement of 0.395 dB on average with respect to PSNR and a generated code amount reduction of 2.70% on average with respect to the bit rate.

In addition, according to the present invention, in comparison to the conventional scheme, the experimental results in FIG. 22B show an image quality improvement of 0.546 dB on average with respect to PSNR and a generated code amount reduction of 3.47% on average with respect to the bit rate.

Figure 23A:
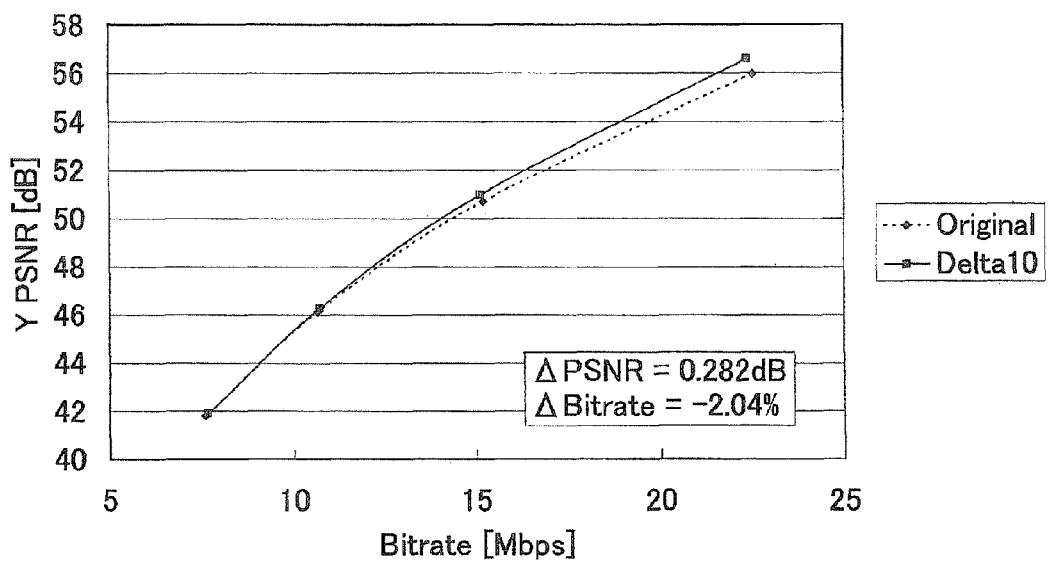
FIG. 23A is also a diagram explaining the result of experiments.
Figure 23B:
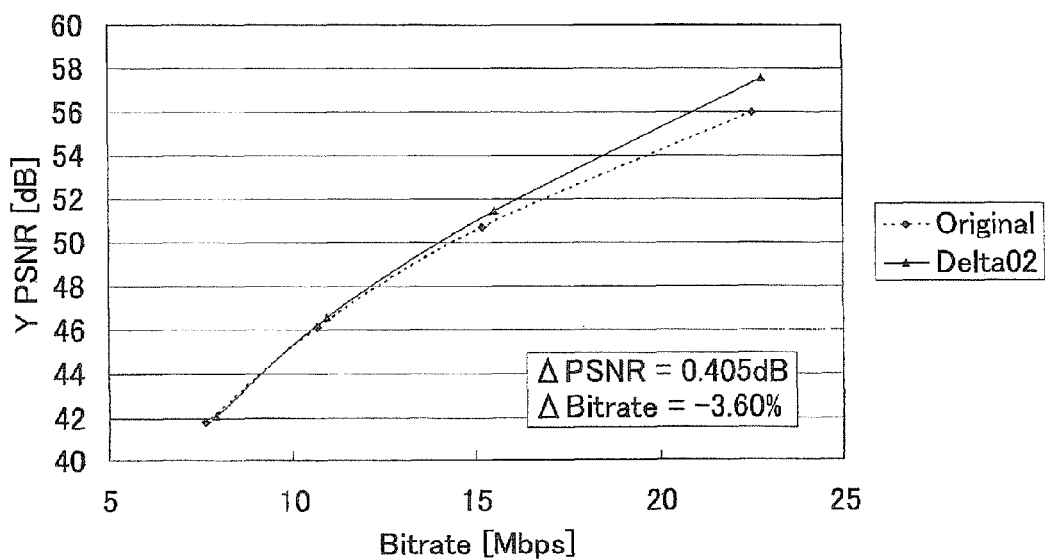
FIG. 23B is also a diagram explaining the result of experiments.

(7) Experimental Results in FIGS. 23A and 23B

FIGS. 23A and 23B illustrate the experimental results in the case in which the kind of image is "Tempete", the image size is CIF, and the block size is 4×4. FIG. 23A illustrates the experimental results in the case of $\Delta=10$, and FIG. 23B illustrates the experimental results in the case of $\Delta=2$.

According to the present invention, in comparison to the conventional scheme, the experimental results in FIG. 23A show an image quality improvement of 0.282 dB on average with respect to PSNR and a generated code amount reduction of 2.04% on average with respect to the bit rate.

In addition, according to the present invention, in comparison to the conventional scheme, the experimental results in FIG. 23B show an image quality improvement of 0.405 dB on average with respect to PSNR and a generated code amount reduction of 3.60% on average with respect to the bit rate.

Figure 24A:
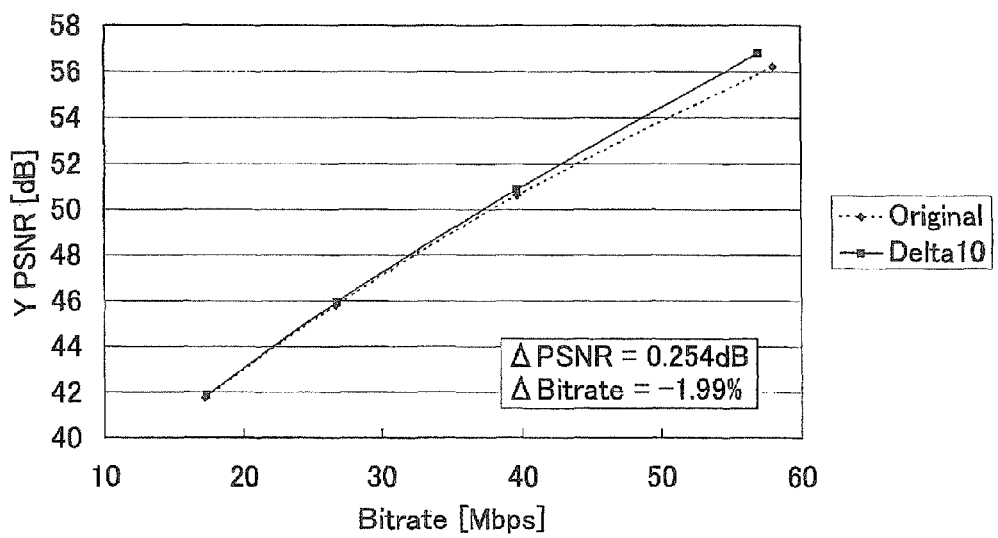
FIG. 24A is also a diagram explaining the result of experiments.
Figure 24B:
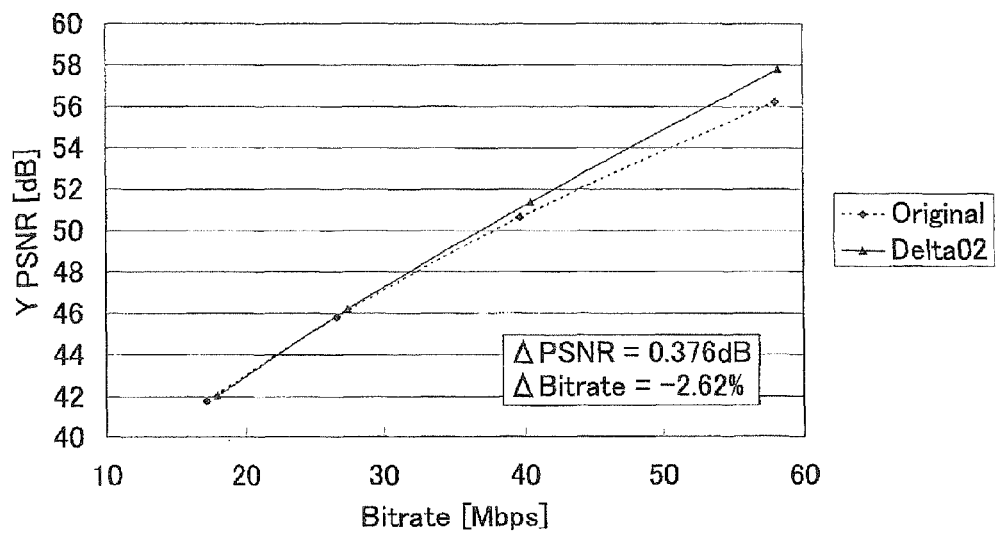
FIG. 24B is also a diagram explaining the result of experiments.

(8) Experimental Results in FIGS. 24A and 24B

FIGS. 24A and 24B illustrate the experimental results in the case in which the kind of image is "Whale Show", the image size is SD, and the block size is 4×4. FIG. 24A illustrates the experimental results in the case of $\Delta=10$, and FIG. 24B illustrates the experimental results in the case of $\Delta=2$.

According to the present invention, in comparison to the conventional scheme, the experimental results in FIG. 24A show an image quality improvement of 0.254 dB on average with respect to PSNR and a generated code amount reduction of 1.99% on average with respect to the bit rate.

In addition, according to the present invention, in comparison to the conventional scheme, the experimental results in FIG. 24B show an image quality improvement of 0.376 dB on average with respect to PSNR and a generated code amount reduction of 2.62% on average with respect to the bit rate.

Figure 25A:
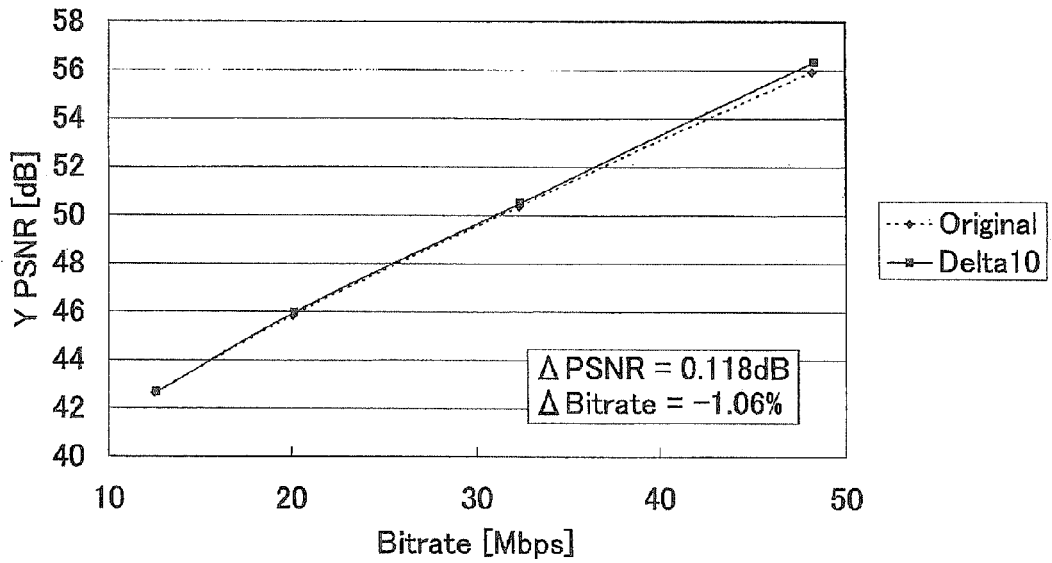
FIG. 25A is also a diagram explaining the result of experiments.
Figure 25B:
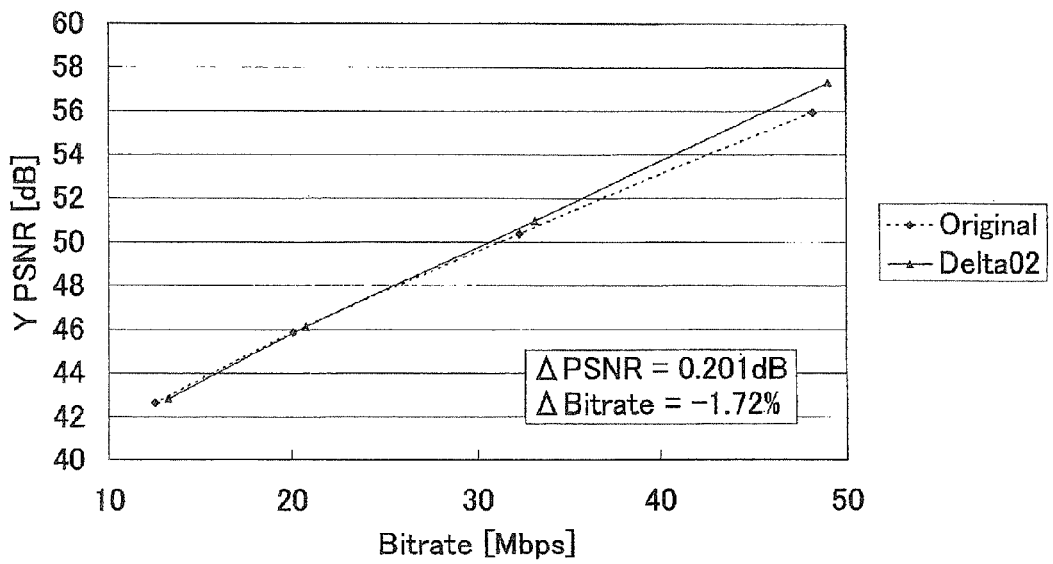
FIG. 25B is also a diagram explaining the result of experiments.

(9) Experimental Results in FIGS. 25A and 25B

FIGS. 25A and 25B illustrate the experimental results in the case in which the kind of image is "Crowded Crosswalk", the image size is SD, and the block size is 4×4. FIG. 25A illustrates the experimental results in the case of $\Delta=10$, and FIG. 25B illustrates the experimental results in the case of $\Delta=2$.

According to the present invention, in comparison to the conventional scheme, the experimental results in FIG. 25A show an image quality improvement of 0.118 dB on average with respect to PSNR and a generated code amount reduction of 1.06% on average with respect to the bit rate.

In addition, according to the present invention, in comparison to the conventional scheme, the experimental results in FIG. 25B show an image quality improvement of 0.201 dB on average with respect to PSNR and a generated code amount reduction of 1.72% on average with respect to the bit rate.

Figure 26A:
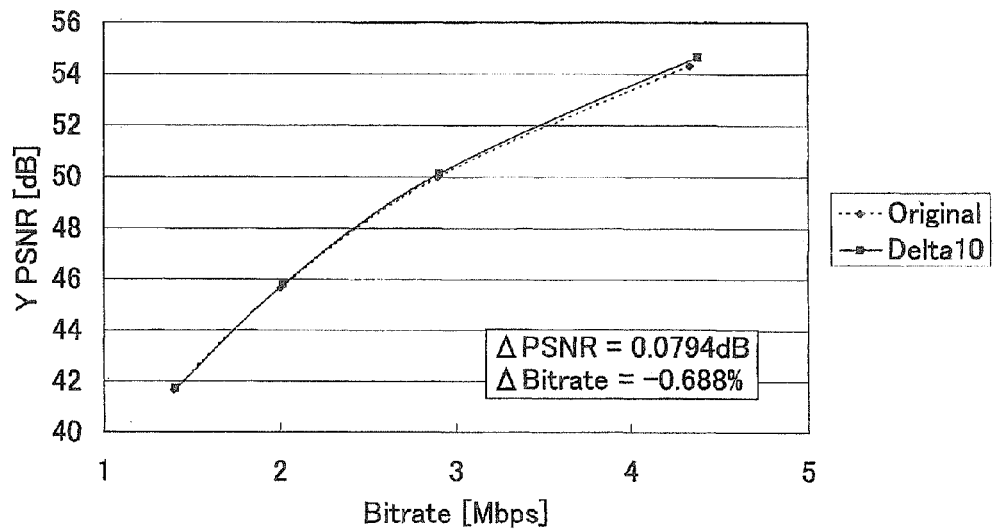
FIG. 26A is also a diagram explaining the result of experiments.
Figure 26B:
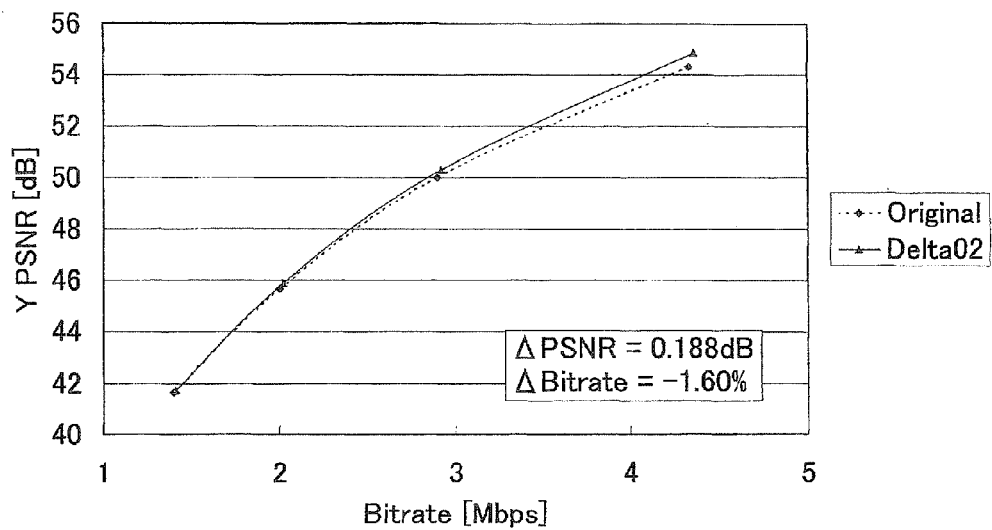
FIG. 26B is also a diagram explaining the result of experiments.

(10) Experimental Results in FIGS. 26A and 26B

FIGS. 26A and 26B illustrate the experimental results in the case in which the kind of image is "Container", the image size is QCIF, and the block size is 8×8. FIG. 26A illustrates the experimental results in the case of $\Delta=10$, and FIG. 26B illustrates the experimental results in the case of $\Delta=2$.

According to the present invention, in comparison to the conventional scheme, the experimental results in FIG. 26A show an image quality improvement of 0.0794 dB on average with respect to PSNR and a generated code amount reduction of 0.688% on average with respect to the bit rate.

In addition, according to the present invention, in comparison to the conventional scheme, the experimental results in FIG. 26B show an image quality improvement of 0.188 dB on average with respect to PSNR and a generated code amount reduction of 1.60% on average with respect to the bit rate.

Figure 27A:
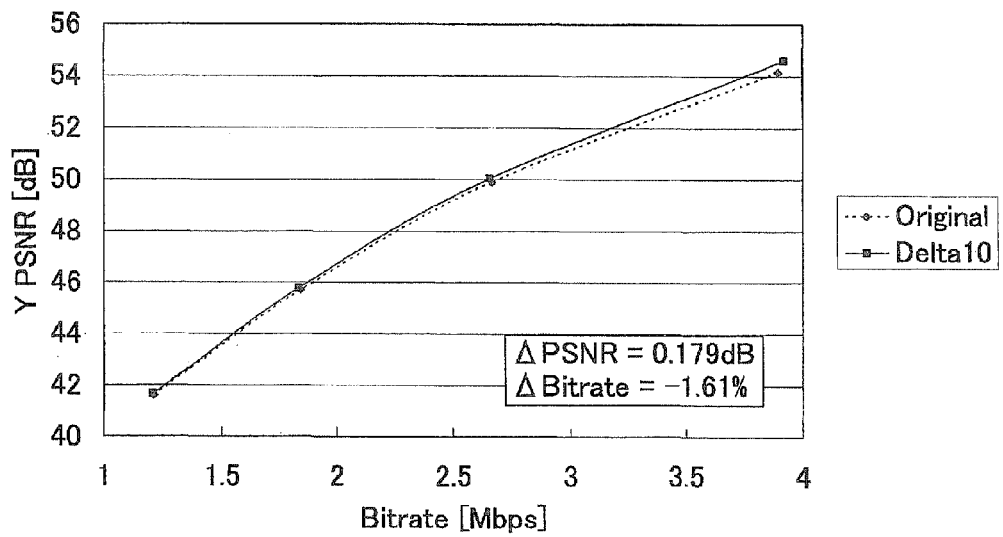
FIG. 27A is also a diagram explaining the result of experiments.
Figure 27B:
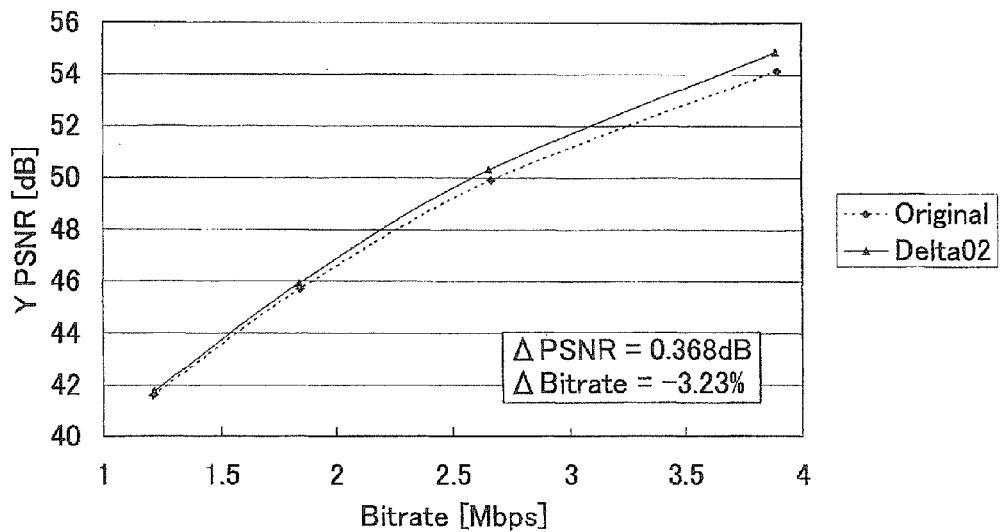
FIG. 27B is also a diagram explaining the result of experiments.

(11) Experimental Results in FIGS. 27A and 27B

FIGS. 27A and 27B illustrate the experimental results in the case in which the kind of image is "Foreman", the image size is QCIF, and the block size is 8×8. FIG. 27A illustrates the experimental results in the case of $\Delta=10$, and FIG. 27B illustrates the experimental results in the case of $\Delta=2$.

According to the present invention, in comparison to the conventional scheme, the experimental results in FIG. 27A show an image quality improvement of 0.179 dB on average with respect to PSNR and a generated code amount reduction of 1.61% on average with respect to the bit rate.

In addition, according to the present invention, in comparison to the conventional scheme, the experimental results in FIG. 27B show an image quality improvement of 0.368 dB on average with respect to PSNR and a generated code amount reduction of 3.23% on average with respect to the bit rate.

Figure 28A:
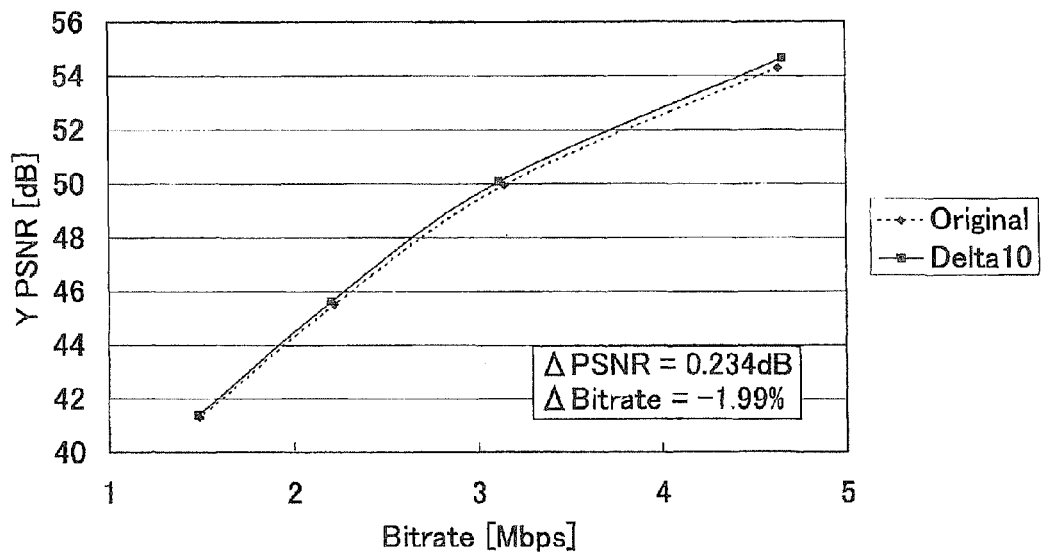
FIG. 28A is also a diagram explaining the result of experiments.
Figure 28B:
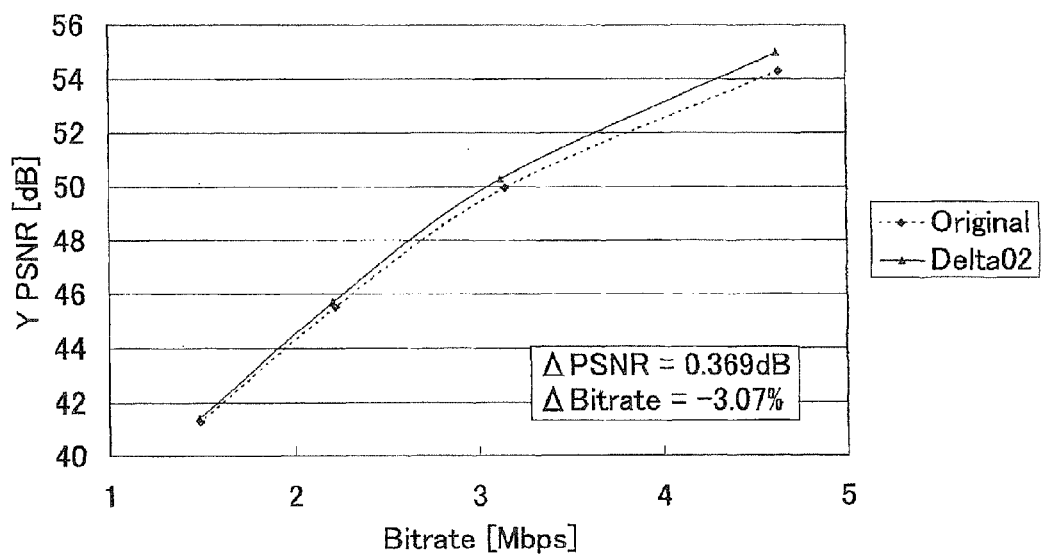
FIG. 28B is also a diagram explaining the result of experiments.

(12) Experimental Results in FIGS. 28A and 28B

FIGS. 28A and 28B illustrate the experimental results in the case in which the kind of image is "Silent", the image size is QCIF, and the block size is 8×8. FIG. 28A illustrates the experimental results in the case of $\Delta=10$, and FIG. 28B illustrates the experimental results in the case of $\Delta=2$.

According to the present invention, in comparison to the conventional scheme, the experimental results in FIG. 28A show an image quality improvement of 0.234 dB on average with respect to PSNR and a generated code amount reduction of 1.99% on average with respect to the bit rate.

In addition, according to the present invention, in comparison to the conventional scheme, the experimental results in FIG. 28B show an image quality improvement of 0.369 dB on average with respect to PSNR and a generated code amount reduction of 3.07% on average with respect to the bit rate.

Figure 29A:
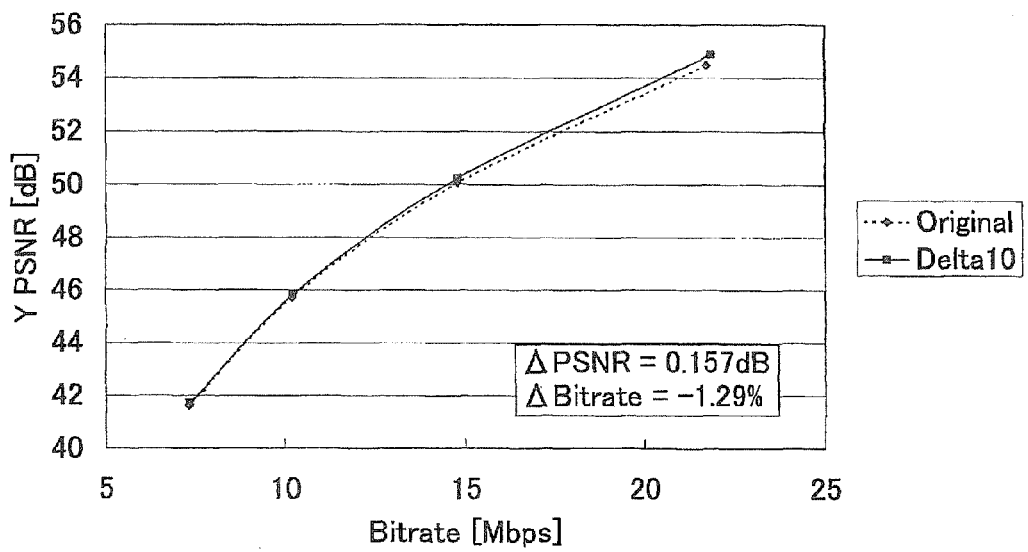
FIG. 29A is also a diagram explaining the result of experiments.
Figure 29B:
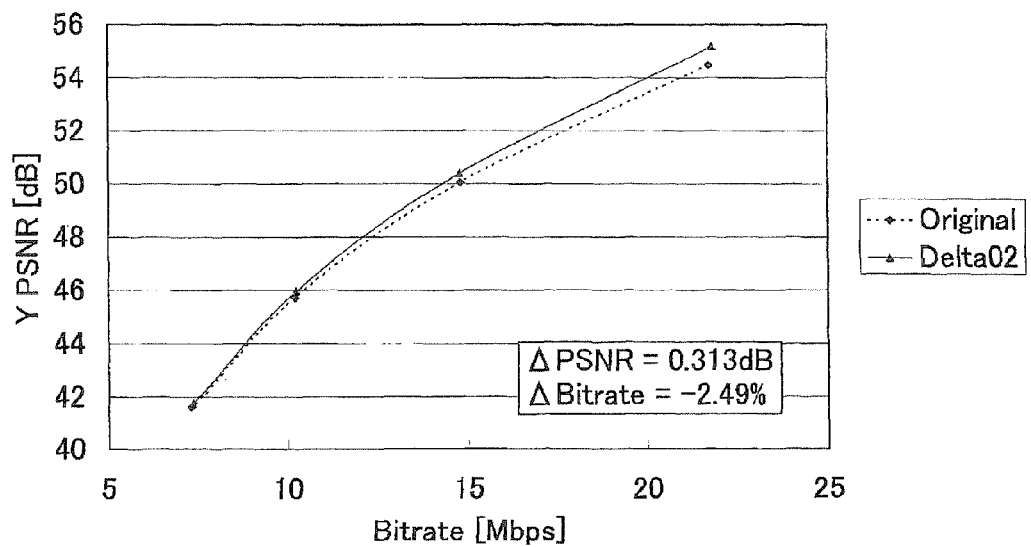
FIG. 29B is also a diagram explaining the result of experiments.

(13) Experimental Results in FIGS. 29A and 29B

FIGS. 29A and 29B illustrate the experimental results in the case in which the kind of image is "Paris", the image size is CIF, and the block size is 8×8. FIG. 29A illustrates the experimental results in the case of $\Delta=10$, and FIG. 29B illustrates the experimental results in the case of $\Delta=2$.

According to the present invention, in comparison to the conventional scheme, the experimental results in FIG. 29A show an image quality improvement of 0.157 dB on average with respect to PSNR and a generated code amount reduction of 1.29% on average with respect to the bit rate.

In addition, according to the present invention, in comparison to the conventional scheme, the experimental results in FIG. 29B show an image quality improvement of 0.313 dB on average with respect to PSNR and a generated code amount reduction of 2.49% on average with respect to the bit rate.

Figure 30A:
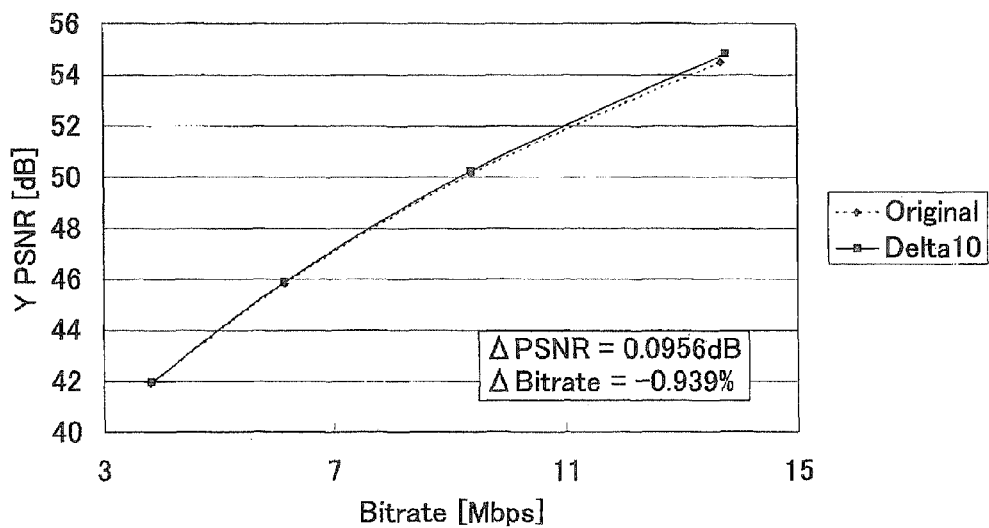
FIG. 30A is also a diagram explaining the result of experiments.
Figure 30B:
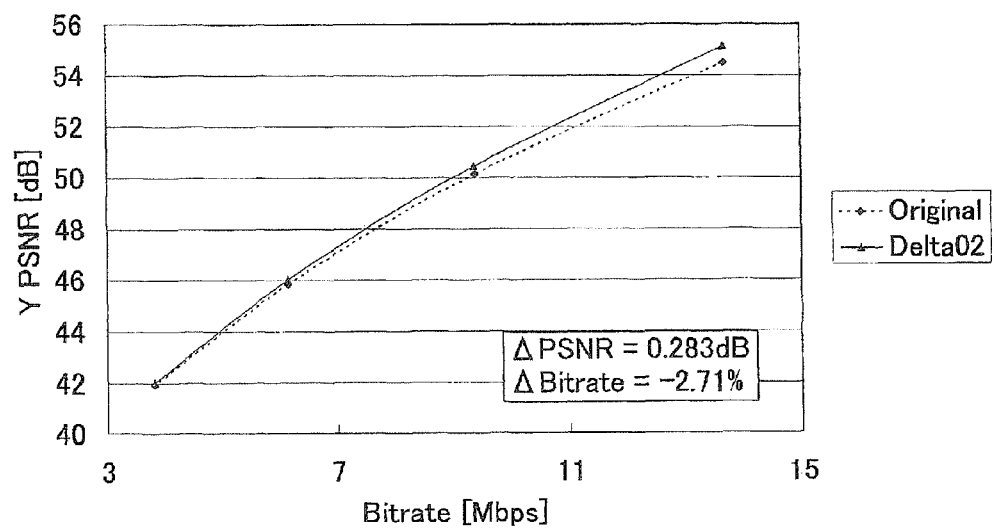
FIG. 30B is also a diagram explaining the result of experiments.

(14) Experimental Results in FIGS. 30A and 30B

FIGS. 30A and 30B illustrate the experimental results in the case in which the kind of image is "Foreman", the image size is CIF, and the block size is 8×8. FIG. 30A illustrates the experimental results in the case of Δ=10, and FIG. 30B illustrates the experimental results in the case of Δ=2.

According to the present invention, in comparison to the conventional scheme, the experimental results in FIG. 30A show an image quality improvement of 0.0956 dB on average with respect to PSNR and a generated code amount reduction of 0.939% on average with respect to the bit rate.

In addition, according to the present invention, in comparison to the conventional scheme, the experimental results in FIG. 30B show an image quality improvement of 0.283 dB on average with respect to PSNR and a generated code amount reduction of 2.71% on average with respect to the bit rate.

Figure 31A:
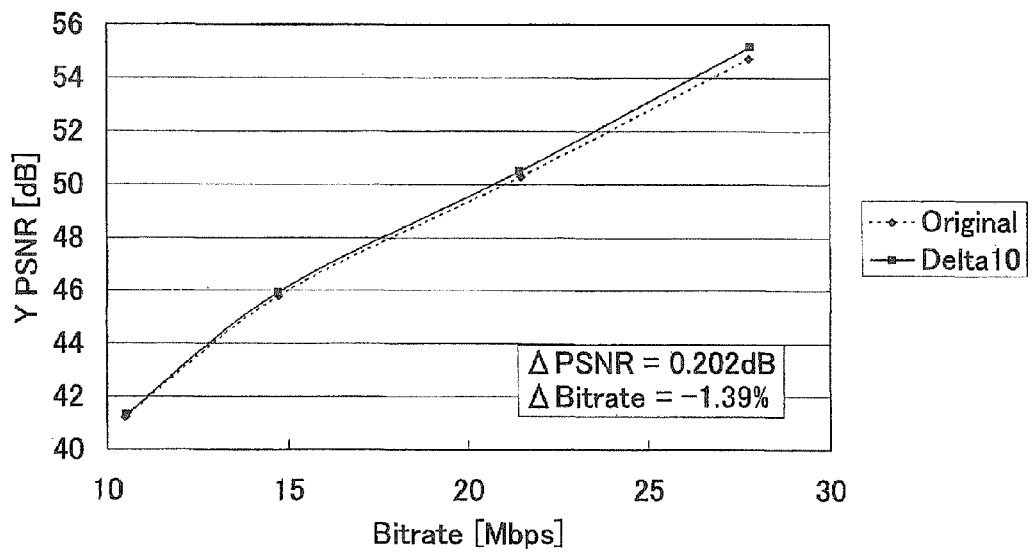
FIG. 31A is also a diagram explaining the result of experiments.
Figure 31B:
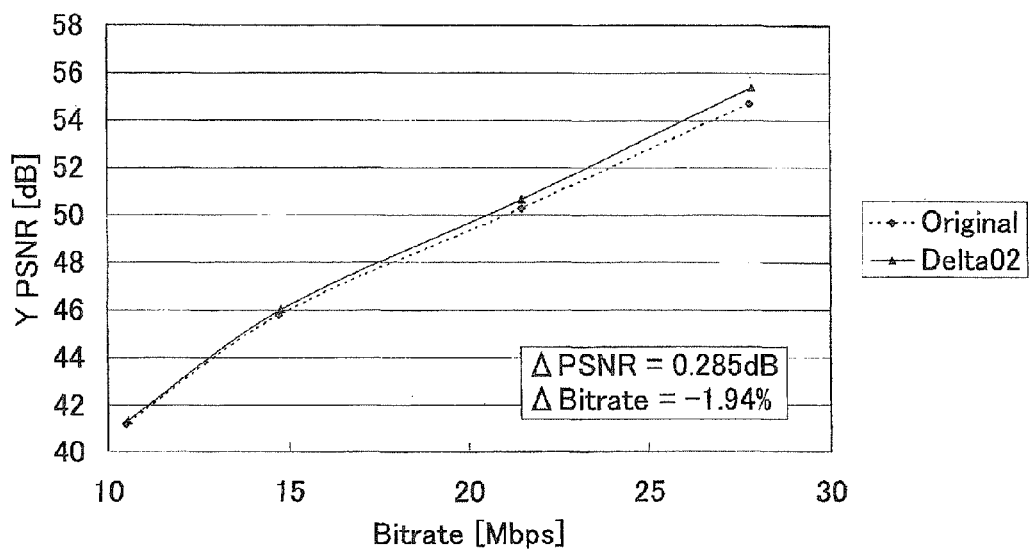
FIG. 31B is also a diagram explaining the result of experiments.

(15) Experimental Results in FIGS. 31A and 31B

FIGS. 31A and 31B illustrate the experimental results in the case in which the kind of image is "Mobile", the image size is CIF, and the block size is 8×8. FIG. 31A illustrates the experimental results in the case of Δ=10, and FIG. 31B illustrates the experimental results in the case of Δ=2.

According to the present invention, in comparison to the conventional scheme, the experimental results in FIG. 31A show an image quality improvement of 0.202 dB on average with respect to PSNR and a generated code amount reduction of 1.39% on average with respect to the bit rate.

In addition, according to the present invention, in comparison to the conventional scheme, the experimental results in FIG. 31B show an image quality improvement of 0.285 dB on average with respect to PSNR and a generated code amount reduction of 1.94% on average with respect to the bit rate.

Figure 32A:
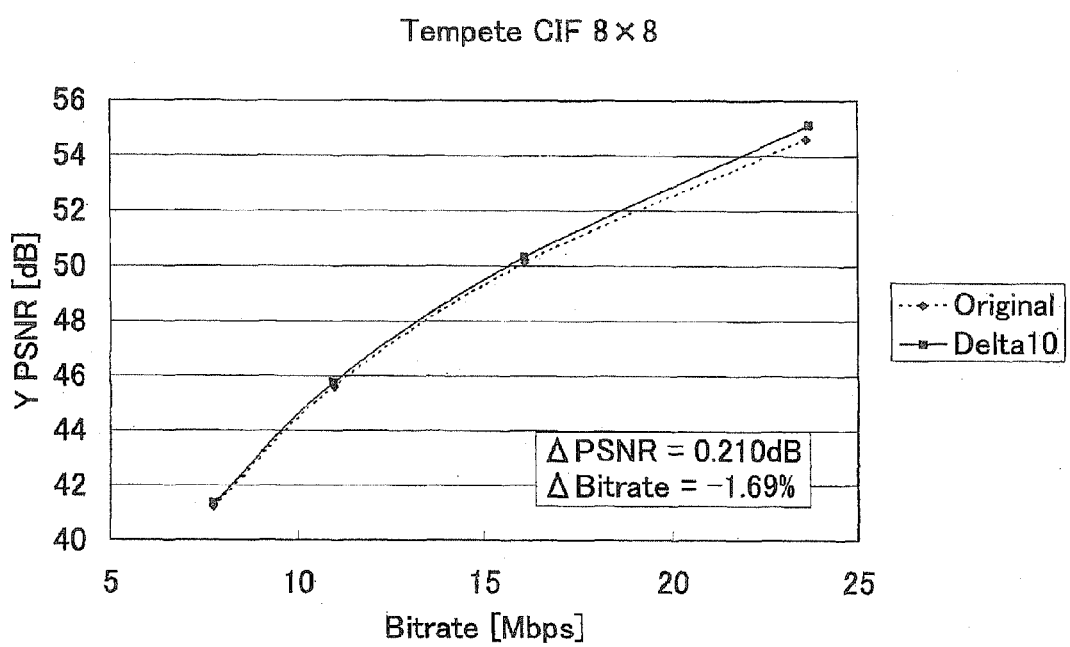
FIG. 32A is also a diagram explaining the result of experiments.
Figure 32B:
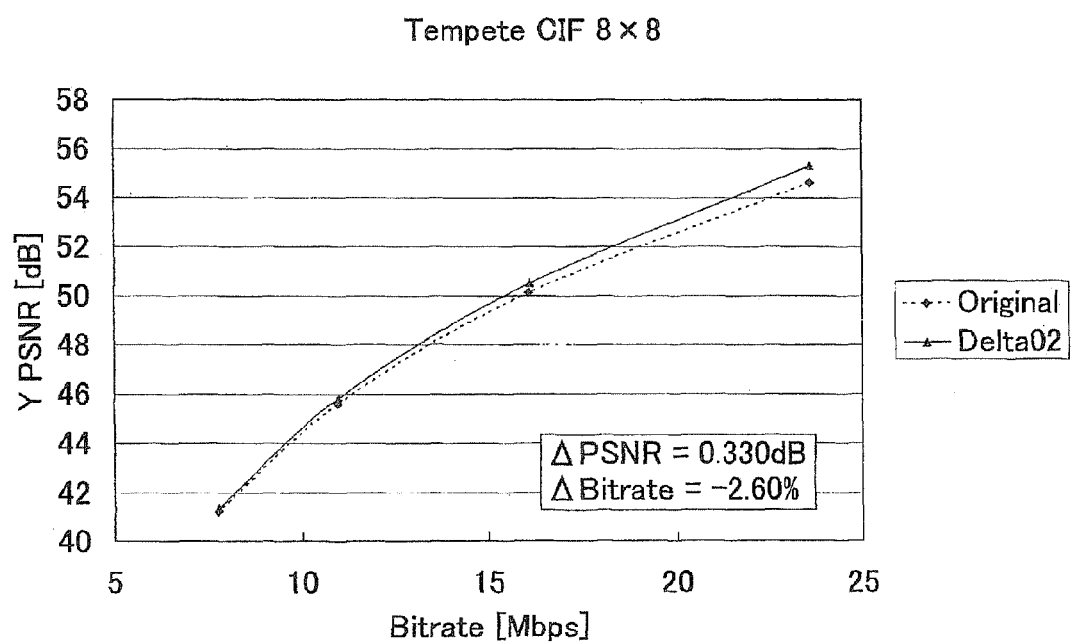
FIG. 32B is also a diagram explaining the result of experiments.

(16) Experimental Results in FIGS. 32A and 32B

FIGS. 32A and 32B illustrate the experimental results in the case in which the kind of image is "Tempete", the image size is CIF, and the block size is 8×8. FIG. 32A illustrates the experimental results in the case of Δ=10, and FIG. 32B illustrates the experimental results in the case of Δ=2.

According to the present invention, in comparison to the conventional scheme, the experimental results in FIG. 32A show an image quality improvement of 0.210 dB on average with respect to PSNR and a generated code amount reduction of 1.69% on average with respect to the bit rate.

In addition, according to the present invention, in comparison to the conventional scheme, the experimental results in FIG. 32B show an image quality improvement of 0.330 dB on average with respect to PSNR and a generated code amount reduction of 2.60% on average with respect to the bit rate.

Figure 33A:
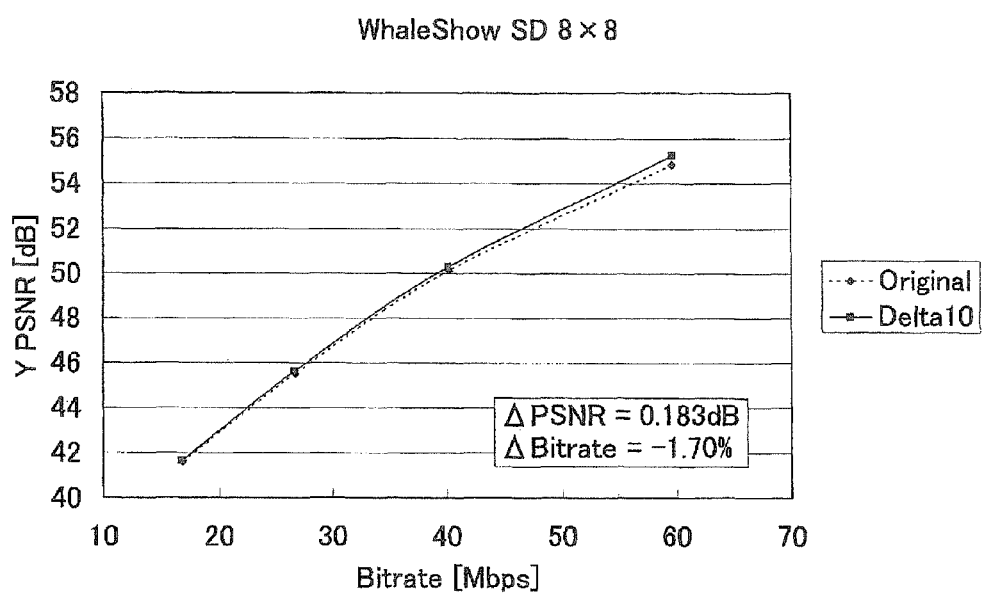
FIG. 33A is also a diagram explaining the result of experiments.
Figure 33B:
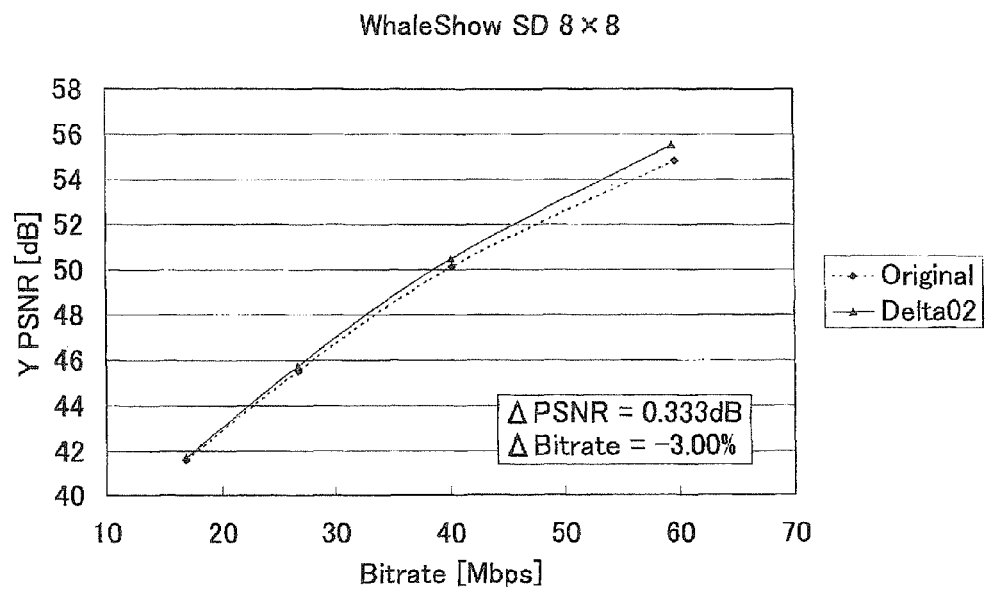
FIG. 33B is also a diagram explaining the result of experiments.

(17) Experimental Results in FIGS. 33A and 33B

FIGS. 33A and 33B illustrate the experimental results in the case in which the kind of image is "Whale Show", the image size is SD, and the block size is 8×8. FIG. 33A illustrates the experimental results in the case of Δ=10, and FIG. 33B illustrates the experimental results in the case of Δ=2.

According to the present invention, in comparison to the conventional scheme, the experimental results in FIG. 33A show an image quality improvement of 0.183 dB on average with respect to PSNR and a generated code amount reduction of 1.70% on average with respect to the bit rate.

In addition, according to the present invention, in comparison to the conventional scheme, the experimental results in FIG. 33B show an image quality improvement of 0.333 dB on average with respect to PSNR and a generated code amount reduction of 3.00% on average with respect to the bit rate.

Figure 34A:
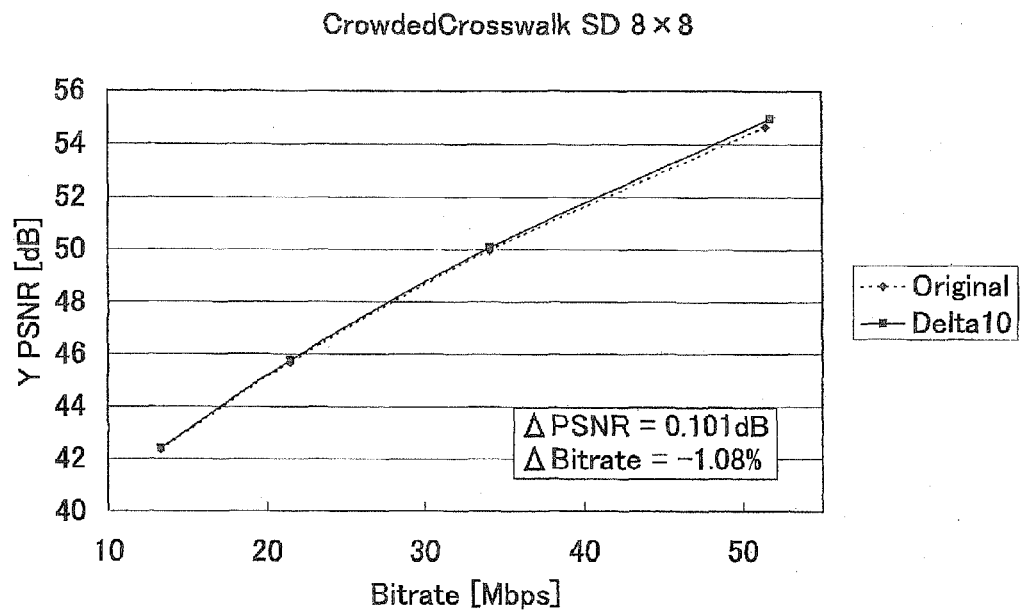
FIG. 34A is also a diagram explaining the result of experiments.
Figure 34B:
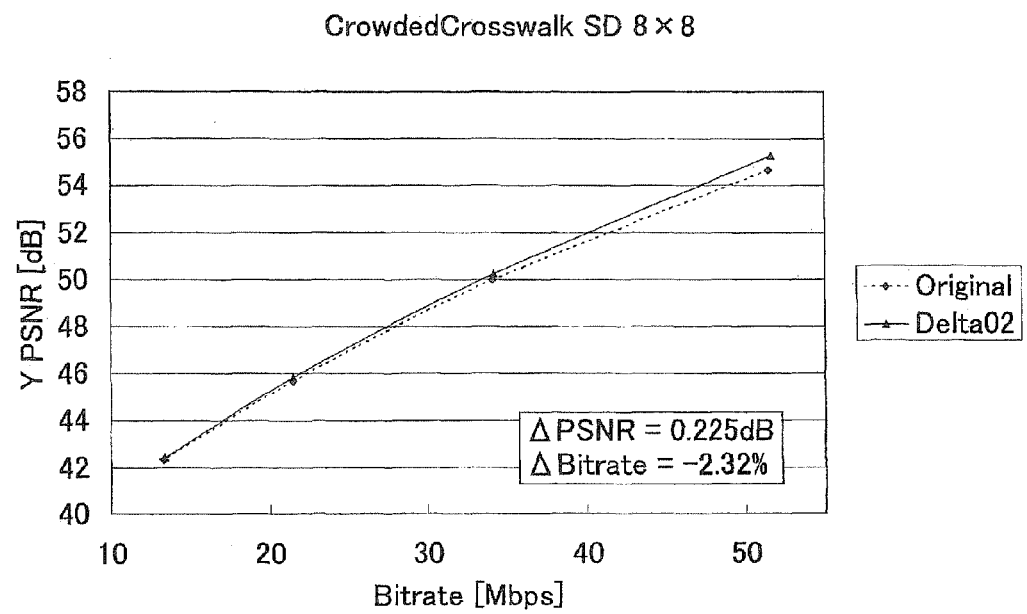
FIG. 34B is also a diagram explaining the result of experiments.

(18) Experimental Results in FIGS. 34A and 34B

FIGS. 34A and 34B illustrate the experimental results in the case in which the kind of image is "Crowded Crosswalk", the image size is SD, and the block size is 8×8. FIG. 34A illustrates the experimental results in the case of Δ=10, and FIG. 34B illustrates the experimental results in the case of Δ=2.

According to the present invention, in comparison to the conventional scheme, the experimental results in FIG. 34A show an image quality improvement of 0.101 dB on average with respect to PSNR and a generated code amount reduction of 1.08% on average with respect to the bit rate.

In addition, according to the present invention, in comparison to the conventional scheme, the experimental results in FIG. 34B show an image quality improvement of 0.225 dB on average with respect to PSNR and a generated code amount reduction of 2.32% on average with respect to the bit rate.

FIG. 35 illustrates a table of the experimental results as shown in FIGS. 17A to 34B.

As can be understood from the experimental results as shown in FIGS. 17A to 34B and the table as shown in FIG. 35, according to the present invention, the PSNR can be improved and the generated code amount can be reduced in comparison to the conventional scheme.

Next, an example of a case in which a scheme of "adaptively applying the gradient to the predicted signal" according to the present invention is applied to a DC prediction (i.e. prediction mode 2 (an average value prediction): a mode in which a predicted value with respect to a given block is obtained by interpolating pixel values in an oblique direction with reference to neighboring pixels of the upper side block and neighboring pixels of the left side block) in the case in which the prediction mode of the intraframe prediction is H.264/MPEG-4AVC, will be described.

According to the intraframe prediction that is executed by the intraframe prediction encoding apparatus 10 in the first embodiment, if it is assumed that the pixel value of a predicted pixel is y, the distance from a reference pixel to the predicted pixel is x, and the pixel value of the reference pixel is β, the pixel value y of the predicted pixel has been defined by y=αx+β as shown in Equation (1).

In contrast, in the DC prediction, a block to be predicted is generated using the average value of available reference pixels. That is, in the DC prediction, since there is no concept of "prediction direction", the predicted signal is generated using the following Equation (13).

$$y(\text{DC}) = (\Sigma Ri)/m + \alpha \quad (13)$$

Here, Ri denotes the signal value of the i-th reference pixel available when the DC prediction is used, and m denotes the total number of available reference pixels.

Figures 36, 37:
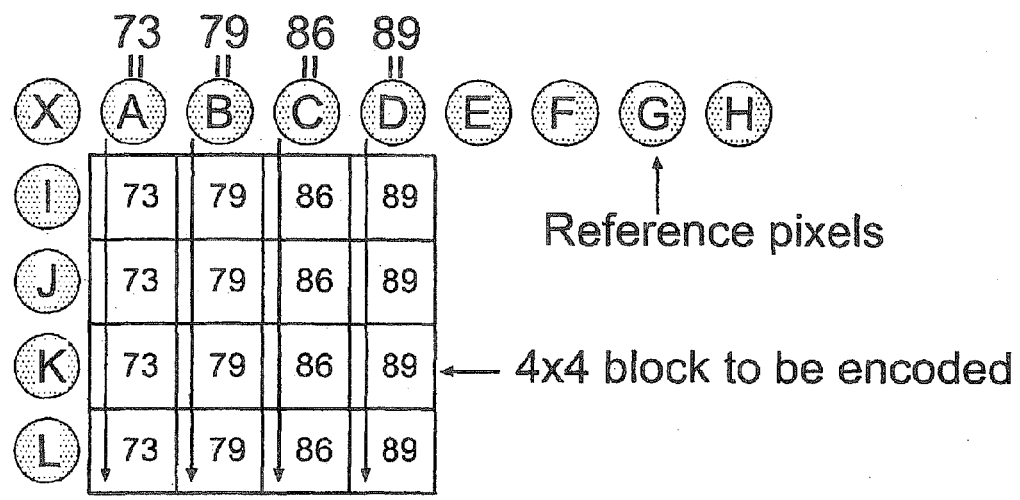
FIG. 36 is a diagram explaining a conventional art.
FIG. 37 is a diagram explaining a DC prediction in H.264/MPEG-4AVC.

Specifically, as shown in FIG. 37, if the upper side and the left side of a block to be predicted are available (i.e. m=8), in H.264/AVC, calculation is performed as follows:

$$\begin{aligned} y(DC \text{ of } H.264) &= (\Sigma Ri)/m \\ &= (A+B+C+D+I+J+K+L+4) >> 5 \\ &= (69+76+73+82+71+70+ \\ &\quad 70+68+4) >> 5 \\ &= 72 \end{aligned}$$

Here, >> denotes a bit shift process.

That is, the above calculation is the same process of obtaining the average value of eight pixels and rounding to the nearest whole number by ((69+76+ . . . +70+68)/8=72.375≈72).

In the present embodiment, an amount corresponding to the gradient that further reduces a prediction error is obtained by adding α thereto, and the amount is encoded as the gradient information (where, α is "a value added to the pixel value" in the present invention, and may have any one of positive and negative values).

That is, under the condition of Δ=1, n=3, and gradient=[−1, 0, 1] as shown in the example of the intraframe prediction encoding apparatus 10 as described above, a predicted signal of a given block is determined by obtaining, in addition to 72 as shown in FIG. 37, three different candidates of 71, 72, and 73 as follows, and selecting one of them that realizes the best cost.

In the case of gradient[0], y(DC)=72+(−1)=71
In the case of gradient[1], y(DC)=72+(0)=72 (corresponding to a conventional H.264/AVC)
In the case of gradient[2], y(DC)=72+(+1)=73

This is a feature when the present invention is applied to the DC prediction in comparison to other prediction modes.

It is noted that if the upper side pixels are not available in FIG. 37, in H.264/AVC, (I+J+K+L+2)>>4 is calculated using the left side pixels, while if the left side pixels are not available, (A+B+C+D+2)>>4 is calculated using the upper side pixels.

The above calculation is the same process of adding four pixel values, dividing the added value by 4, and rounding to the nearest whole number.

The present embodiment can realize the prediction that can flexibly reduce the residual signal based on the property of an image by further adding α in the same manner for the respective cases.

A scheme of executing a gradient prediction based on a preceding image data block is disclosed in Japanese Unexamined Patent Application, First Publication No. H10-224804.

According to this scheme, in predicting a new image data block, a horizontal gradient and a vertical gradient are determined from a block positioned above the new block in a diagonal direction, and based on these gradients, an encoder predicts image information based on image processing of any one of a block neighboring in the horizontal direction to the new block, a block vertically neighboring to the new block, and a block neighboring in the vertical direction to the new block. Accordingly, this scheme is fundamentally different from the scheme according to the present invention

INDUSTRIAL APPLICABILITY

The present invention can be applied to the encoding of an image using an intraframe prediction, and by generating a prediction signal to which a gradient is applied so that the prediction signal matches an actual image, a prediction error can be reduced, and thus compression efficiency can be improved.

The invention claimed is:

1. An image encoding apparatus for encoding an image using an intraframe prediction, comprising:
a processor programmed to select the optimum combination of a gradient of a pixel value that is indicated by an image signal to be predicted and a prediction mode from among combinations of a plurality of gradient candidates and prediction modes that are available to a block to be encoded to which pixels to be predicted belong, the combination of the gradient and the prediction mode being selected for each of the block sizes of the image signal including a 4×4 block size, the gradient candidates being defined as Δ×gradient[i] (0≤i<n) where Δ denotes a constant, gradient[i] denotes a set of predetermined gradients, and n denotes the number of the predetermined gradients in the set;
a processor programmed to generate a predicted signal with a gradient applied thereto in accordance with the distance from a prediction reference pixel based on the selected gradient and the selected prediction mode, the prediction reference pixel being a pixel that is closest to the block to be encoded;
a processor programmed to perform intraframe-encoding of the image signal to be predicted based on the generated predicted signal; and
a processor programmed to encode information indicating the size of the selected gradient and the selected prediction mode for all block sizes.

2. The image encoding apparatus according to claim 1, wherein the processor selecting the gradient generates a plurality of predicted signal candidates having different gradients based on the plurality of gradient candidates, and selects a gradient indicated by the image signal to be predicted among the plurality of gradient candidates by identifying a predicted signal candidate having the minimum encoding cost among the predicted signal candidates.

3. An image decoding apparatus for decoding encoded data of an image encoded using an intraframe prediction, comprising:
a processor programmed to acquire a gradient and a prediction mode for all block sizes which are used on an image encoding side by decoding information for applying a gradient of a pixel value to a predicted signal in accordance with the distance from a prediction reference pixel, the information including the optimum combination of the gradient and the prediction mode which are selected from among combinations of a plurality of gradient candidates and prediction modes that are available to a block to be encoded to which pixels to be predicted belong, the combination of the gradient and the prediction mode being selected for each of the block sizes of an image signal including a 4×4 block size, the prediction reference pixel being a pixel that is closest to the block to be encoded, the gradient candidates being defined as Δ×gradient[i] (0≤i<n) where Δ denotes a constant, gradient[i] denotes a set of predetermined gradients, and n denotes the number of the predetermined gradients in the set;
a processor programmed to restore the predicted signal generated on the image encoding side based on the acquired gradient and the acquired prediction mode; and
a processor programmed to decode a residual signal encoded on the image encoding side, and generate a decoded image signal based on the decoded residual signal and the restored predicted signal.

4. An image encoding method executed by an image encoding apparatus for encoding an image using an intraframe prediction, comprising the steps of:
selecting the optimum combination of a gradient of a pixel value that is indicated by an image signal to be predicted and a prediction mode from among combinations of a plurality of gradient candidates and prediction modes that are available to a block to be encoded to which pixels to be predicted belong, the combination of the gradient and the prediction mode being selected for each of the block sizes of the image signal including a 4×4 block size, the gradient candidates being defined as Δ×gradient[i] (0≤i<n) where Δ denotes a constant, gradient[i] denotes a set of predetermined gradients, and n denotes the number of the predetermined gradients in the set;

generating a predicted signal with a gradient applied thereto in accordance with the distance from a prediction reference pixel based on the selected gradient and the selected prediction mode, the prediction reference pixel being a pixel that is closest to the block to be encoded;

intraframe-encoding the image signal to be predicted based on the generated predicted signal; and encoding information that indicates the size of the selected gradient and the selected prediction mode for all block sizes.

5. The image encoding method according to claim 4, wherein the step of selecting the gradient generates a plurality of predicted signal candidates having different gradients based on the plurality of gradient candidates, and selects a gradient indicated by the image signal to be predicted among the plurality of gradient candidates by identifying a predicted signal candidate having the minimum encoding cost among the predicted signal candidates.

6. An image decoding method executed by an image decoding apparatus for decoding encoded data of an image encoded using an intraframe prediction, comprising the steps of:

acquiring a gradient and a prediction mode for all block sizes which are used on an image encoding side by decoding information for applying a gradient of a pixel value to a predicted signal in accordance with the distance from a prediction reference pixel, the information including the optimum combination of the gradient and the prediction mode which are selected from among combinations of a plurality of gradient candidates and prediction modes that are available to a block to be encoded to which pixels to be predicted belong, the combination of the gradient and the prediction mode being selected for each of the block sizes of an image signal including a 4×4 block size, the prediction reference pixel being a pixel that is closest to the block to be encoded, the gradient candidates being defined as $\Delta \times \text{gradient}[i]$ ($0 \leq i < n$) where $\Delta$ denotes a constant, gradient[i] denotes a set of predetermined gradients, and n denotes the number of the predetermined gradients in the set;

restoring the predicted signal generated on the image encoding side based on the acquired gradient and the acquired prediction mode; and decoding a residual signal encoded on the image encoding side, and generating a decoded image signal based on the decoded residual signal and the restored predicted signal.

* * * * *